(12) United States Patent
Oteki

(10) Patent No.: US 7,911,647 B2
(45) Date of Patent: Mar. 22, 2011

(54) READER APPARATUS

(75) Inventor: Sugitaka Oteki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 517 days.

(21) Appl. No.: 12/121,853

(22) Filed: May 16, 2008

(65) Prior Publication Data

US 2008/0297854 A1 Dec. 4, 2008

(30) Foreign Application Priority Data

May 31, 2007 (JP) ................................ 2007-145133

(51) Int. Cl.
*H04N 1/00* (2006.01)
*H04N 1/40* (2006.01)
*H04N 1/46* (2006.01)
*G06K 9/36* (2006.01)

(52) U.S. Cl. ..................... 358/1.9; 358/426.06; 358/448; 358/453; 358/471; 358/539; 382/232

(58) Field of Classification Search ................... 358/1.9, 358/426.06, 448, 453, 471, 539; 382/232
See application file for complete search history.

(56) References Cited

U.S. PATENT DOCUMENTS

| 5,438,432 A * | 8/1995 | Koue et al. ............... 358/426.06 |
| 5,592,163 A * | 1/1997 | Kimura et al. ................. 341/107 |
| 2005/0030580 A1 * | 2/2005 | Moroi .......................... 358/1.15 |

FOREIGN PATENT DOCUMENTS

| JP | 2005-333482 | 12/2005 |
| JP | 2005-348170 | 12/2005 |

* cited by examiner

*Primary Examiner* — Charlotte M Baker
(74) *Attorney, Agent, or Firm* — IPUSA, PLLC

(57) ABSTRACT

A reader apparatus is provided that includes a reading part configured to read the image of an original material; a coding part configured to code the data of the read image; an image memory configured to contain the coded image data; and a controller configured to control the image reading and the image data coding. The coding part includes a part configured to count the number of lines of the image indicating its size in the original material feed direction; a part configured to code the image data with a provisional number of lines in response to the image size in the original material feed direction being unknown; and a part configured to determine the number of lines at the end of the image reading. The controller includes a part configured to replace the provisional number of lines in the coded data with the determined number of lines.

11 Claims, 28 Drawing Sheets

FIG.2C RELATED ART

| SOFO | Lf | P | Y | X | Nf | CSP |
|------|----|----|----|----|----|-----|

FRAME HEADER

FIG.2D REALATED ART
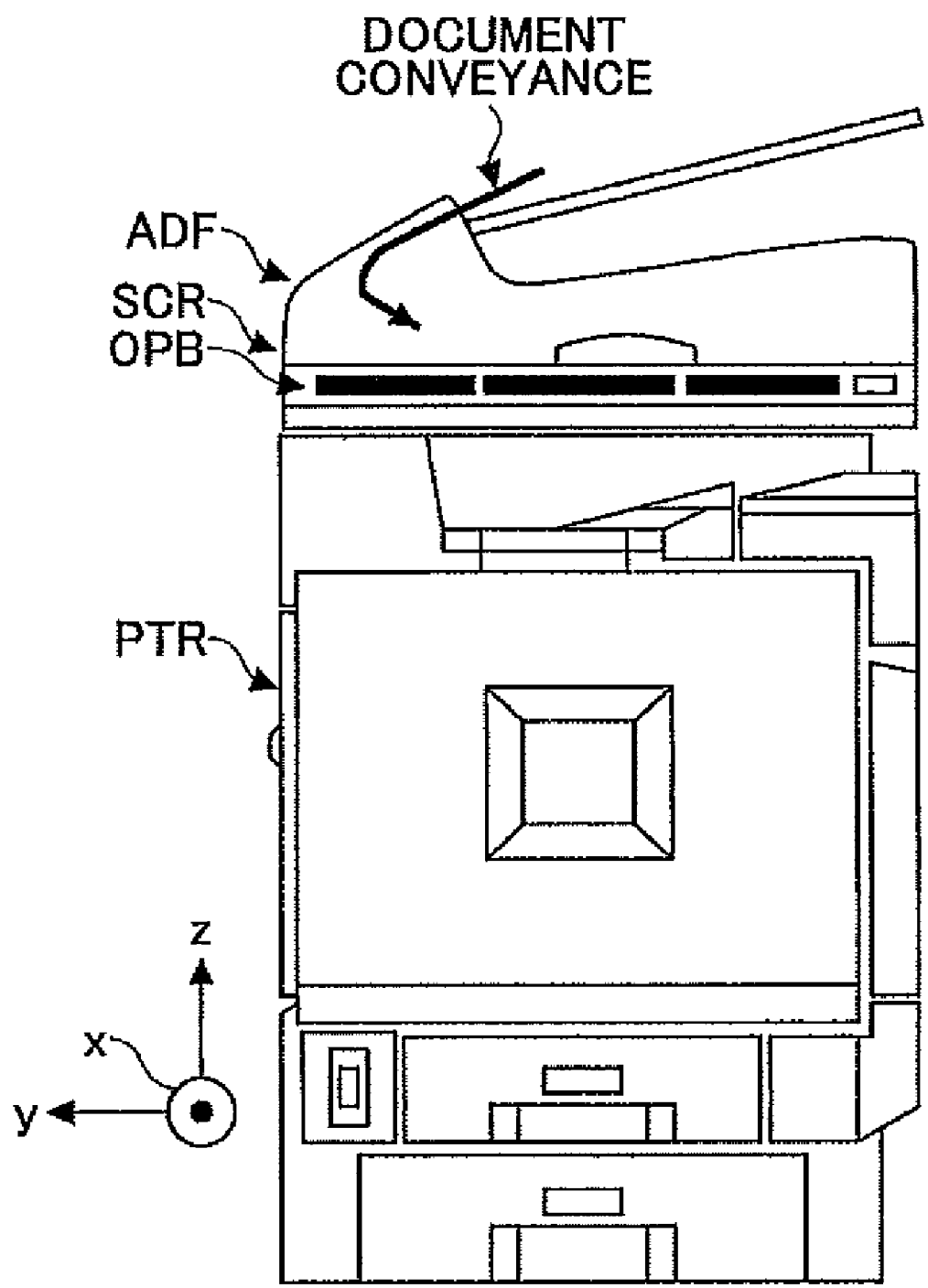

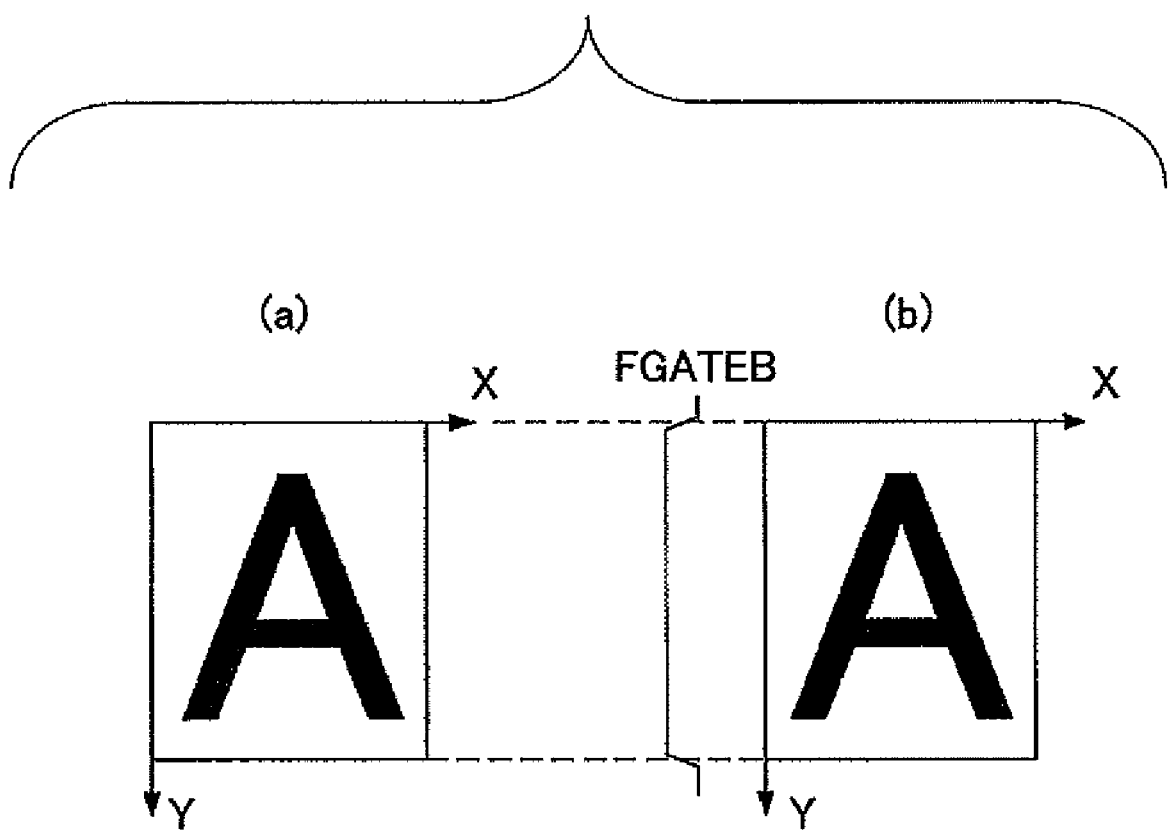

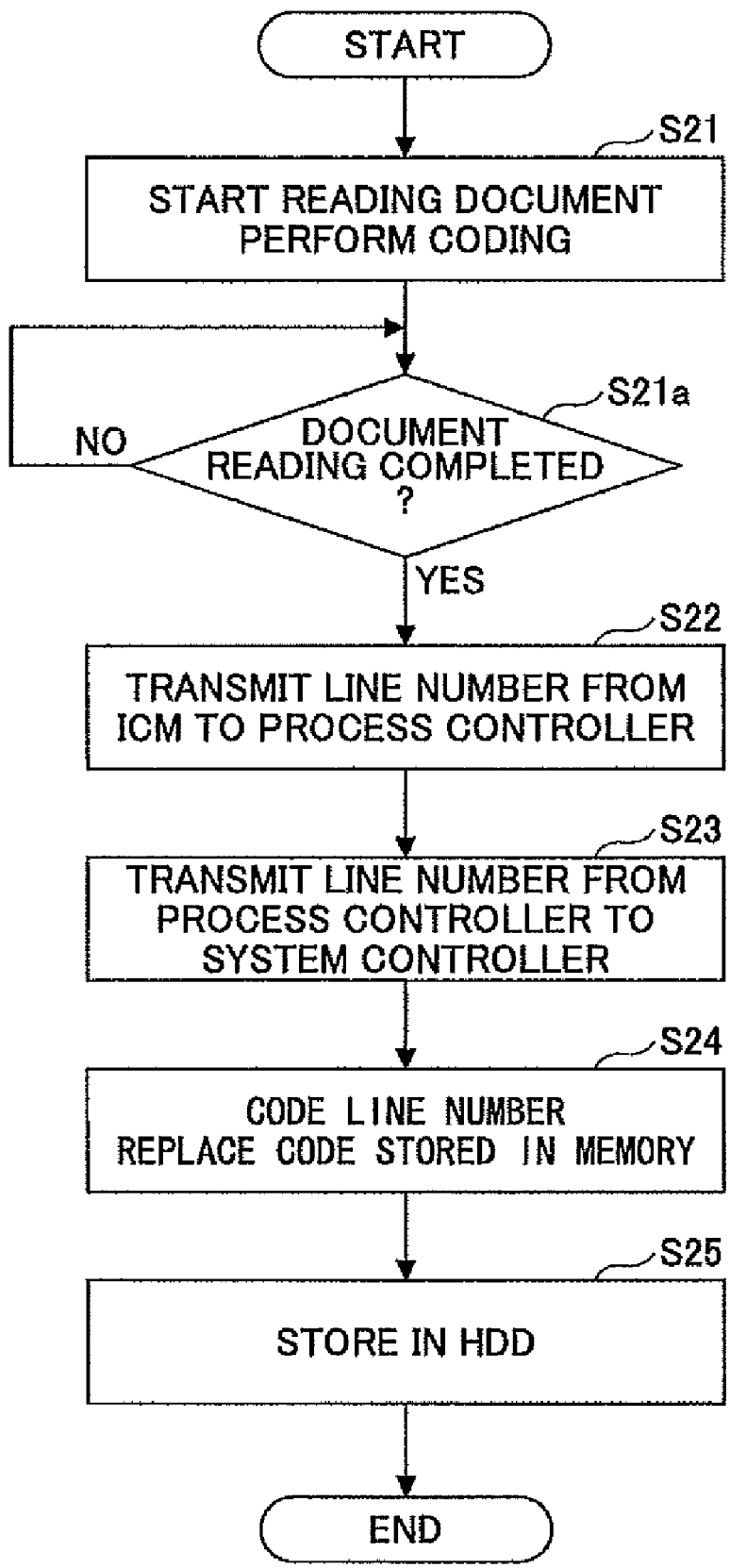

READER APPARATUS

BACKGROUND OF THE INVENTION

1. Field of the Invention

The present invention relates generally to reader apparatuses, and more particularly to a reader apparatus that reads original material into image data, codes the image data, and stores the coded image data in digital copiers, scanners, and multifunction peripherals (MFPs).

2. Description of the Related Art

In color MFPs, which are multifunction machines having multiple functions such as a copying function, a facsimile function, a printing function, and a scanning function, original material such as a document is read into image data by a scanner, and the read image data are processed into codes, so that an input image is obtained. Japanese Laid-Open Patent Application No. 2005-348170 discloses an image reader as a conventional example of such technology. This image reader obtains necessary data at high speed with a single scan. The image reader reads either a color or a monochrome original material. The image reader outputs RGB multi-level data in the case of a color original material and outputs monochrome binary data in the case of monochrome original material.

First, original material such as a document is read. When reading of the original material ends, the result of ACS (automatic color select) is read out. If it is determined that the read original material is in color, the RGB multi-level data contained in an image memory are used, and binary data are discarded as invalid. On the other hand, if it is determined that the read original material is monochrome, the binary data of K (black) contained in the image memory are selected and used, and the RGB multi-level data are discarded as invalid. This eliminates software processing for conversion from G (green) multi-level data into binary data, thus making it possible to increase processing speed.

A description is given, with reference to FIGS. 1A through 1E, FIGS. 2A through 2E, and FIGS. 3A and 3B, of a conventional image processor.

In the following description, a document is taken as an example of the original material to be read.

FIG. 1A is a functional block diagram of the conventional image processor, which is an MFP.

Referring to FIG. 1A, a reading unit 1 optically reads a document. The document is exposed to lamp light, and the reading unit 1 condenses reflected light from the document onto a light-receiving element such as a CCD (charge-coupled device) mounted on a sensor board unit (SBU) 2 through mirrors and a lens. An image signal is converted into an electrical signal in the light-receiving element and then converted further into a digital signal, and is thereafter output from the SBU 2.

The image signal output from the SBU 2 is transferred to an image processing unit (IPU) 3. The IPU 3 corrects the degradation of the image signal in the scanner system, that is, the degradation of the image signal in the optical system, and the degradation of the image signal caused by its quantization into a digital signal.

The output of the IPU 3 is input to an image data controller (compression/decompression and data interface control: CDIC) 4 that performs compression and decompression and data interface control. The CDIC 4 controls the entire image data transmission between a function device and a data bus. The CDIC 4 transfers image data between the IPU 3 and a parallel bus 10, so that the image data are communicated between a system controller 12 (CPU) and a process controller 22. The system controller 12 controls the entire system.

The data transferred from the IPU 3 to the CDIC 4 are transmitted from the CDIC 4 to an image memory access controller (IMAC) 11 via the parallel bus 10. Based on the control of the system controller 12, the IMAC 11 controls access of image data to a memory (MEM) 14; loads printing data from an external apparatus such as a personal computer through a network 15 such as a LAN or the Internet; and compresses and decompresses image data for effective use of the MEM 14.

The data transmitted to the IMAC 11 are compressed and thereafter stored in the MEM 14. The stored data are read out as required. The read-out data are decompressed back into the original image data, and are returned from the IMAC 11 to the CDIC 4 via the parallel bus 10. After being transferred from the CDIC 4 to the IPU 3, the image data are subjected to image quality processing by the IPU 3 and to pulse control in a video data controller (VDC) 5, so that a reproduced image is formed on transfer paper in an image creating unit 6. Image data are transferred through the parallel bus 10 by the control of the CDIC 4, so that the functions of the MFP are implemented.

In the case of processing multiple jobs such as copier output, scanner output, and printer output in parallel, the right to use the reading unit 1, the image creating unit 6, and the parallel bus 10 is assigned to each job by the control of the system controller 12 and the process controller 22. The process controller 22 controls a flow of image data. The system controller 12 controls the entire system and manages activation of resources. A function of the MFP is selected on an operations panel 16, so that the contents of processing, such as copying or scanning, are determined.

The system controller 12 and the process controller 22 communicate with each other through the parallel bus 10, the CDIC 4, and a serial bus 21, The data format is converted in the CDIC 4 for the data interface between the parallel bus 10 and the serial bus 21. In the scanner function, a document is read by the reading unit 1 and the SBU 2. The read image data of the document are subjected to image quality processing in the IPU 3 so as to be stored in the MEM 14 or a hard disk drive (HDD) 13 through the CDIC 4, the parallel bus 10, and the IMAC 11. The image data of the document are transmitted from the MEM 14 or the HDD 13 to the external personal computer through the network 15 as required.

A RON 17 is a fixed storage unit containing programs and parameters for apparatus control. The serial bus 21 is a common bus for serially transferring data such as image data. A RAM 23 is a memory in which data such as image data are temporarily stored. A ROM 24 is a fixed storage unit containing programs and parameters.

FIG. 1B is a schematic block diagram showing the image processing of the IPU 3. A read image input to the IPU 3 through the SBU 2 is transmitted from an input interface (I/F) 3a to a scanner image processing part 3b. Scanner image processing is performed in order to correct the degradation of the read image signal. Corrections such as shading correction, scanner γ correction, and MTF correction are performed in the scanner image processing. After being corrected, the read image data are transferred to the CDIC 4 through an output interface (I/F) 3c.

In the case of outputting an image onto transfer paper, the IPU 3 receives image data from the CDIC 4 through an input I/F 3d, and the image data are subjected to area coverage modulation (tone processing) in an image quality processing part 3e. The data subjected to image quality processing are output to the VDC 5 through an output I/F 3f. The area coverage modulation includes density conversion, dithering, and error diffusion, and principally approximates tone with area.

Storing the image data subjected to scanner image processing in the MEM 14 makes it possible to generate and check various reproduced images by changing image quality processing. For example, it is possible to change the air of a reproduced image by changing the density of the reproduced image or changing the number of lines of a dither matrix. At this point, there is no need to re-read the image from the reading unit 1 every time the processing is changed. Once the stored image is read out from the MEM 14, the same data can be processed differently any number of times. Further, in the case of a single unit of a scanner, the scanner image processing and tone processing are performed together on image data, and the image data are output to the CDIC 4, A command control part 3g manages the switching of processing and changes in a processing procedure.

FIG. 1C is a schematic functional block diagram of the CDIC 4. The data subjected to scanner image correction in the IPU 3 are input to an image data input control part 4a of the CDIC 4. The input data are compressed in a data compression part 4b in order to increase their transfer efficiency in the parallel bus 10, and are sent out to the parallel bus 10 through a parallel data I/F 4c.

The image data input from the parallel bus 10 through the parallel data I/F 4c, which are compressed for bus transfer, are subjected to decompression in a data decompression part 4d. The decompressed image data are transferred to the IPU 3 from an image data output control part 4e. The CDIC 4 performs conversion between parallel data and serial data in a data conversion part 4f. The system controller 12 transfers data to the parallel bus 10, and the process controller 22 transfers data to the serial bus 21. The data conversion is performed for communications between the two controllers 12 and 22.

FIG. 1D is a schematic functional block diagram of the VDC 5. In the VDC 5, additional processing is performed on input image data in accordance with the characteristics of the image creating unit 6. Dot rearrangement due to edge smoothing is performed in an edge smoothing part 5a and pulse control of an image signal for dot formation is performed in a pulse control part 5b. The image data are output to the image creating unit 6. Apart from conversion of image data, the VDC 5 also performs format conversion between parallel data and serial data. Parallel data input through a parallel data I/F 5c and serial data input through a serial data I/F 5d are converted to serial data and parallel data, respectively, in a data conversion part 5e. The VDC 5 alone can support communications between the system controller 12 and the process controller 22.

FIG. 1E is a schematic functional block diagram of the IMAC 11. A parallel data I/F 11a manages input and output of image data through the parallel bus 10. The IMAC 11 is configured to store image data in and read image data from the MEM 14. The IMAC 11 develops code data input from an external apparatus such as a personal computer into image data. The input code data are temporarily stored in a line buffer 11b. The code data stored in the line buffer 11b are developed into image data in a video control part 11e based on a DEVELOP command input from the system controller 12 through a system controller I/F 11d. The developed image data or image data input from the parallel bus 10 through the parallel data I/F 11a are stored in the MEM 14. At this point, the image data to be stored are selected in a data conversion part 11e. Secondary compression of data is performed in a data compression part 11f in order to increase the efficiency of memory use. The image data are stored in the MEN 14 while managing the addresses of the MEM 14 in a memory access control part 11g. In the case of reading out image data stored in the MEM 14, the image data are read out while controlling a reading destination address in the memory access control part 11g, and the read-out image data are decompressed in a data decompression part 11h. The decompressed image data are transferred to the parallel bus 10 through the parallel data I/F 11a.

Here a description is given of Joint Photographic Experts Group (JPEG) coding. Since JPEG is a standardized general-purpose format, a description of its details is omitted. FIG. 2A is a schematic block diagram for illustrating JPEG coding. First, in step S731, color conversion is performed on RGB image data, so that the red, green, blue (RGB) image data are converted into a luminance signal and color-difference signals of YCbCr format. In step S732, the color-difference signals are reduced by sub-sampling. In step S733, a Discrete Cosine Transform (DCT) is performed on the luminance signal and the color-difference signals. In step S734, the signals are quantized, and in step S736, are subjected to variable length coding. In step S738, these signals have a header added to their head so as to be output as a JPEG code.

FIG. 2B is a diagram showing the contents of JPEG coded data. The JPEG coded data basically have a hierarchical structure of three tiers of an image, a frame, and a scan. Here, FIG. 2B shows a basic base line system. A single image is sandwiched between an SOI code and an EOI code. The meanings of the abbreviations shown in FIG. 2B are as follows:

SOI: Acronym for Start Of Image. A marker indicating the start of an image to be coded.

DP: Acronym for Definition Parameters. Definition parameter groups indicating the parameter groups specifying a quantization table 735 and a Huffman table 737.

EOI: Acronym for End Of Image. A marker indicating the end of the image to be coded.

SOF: Acronym for Start Of Frame. A marker indicating the start of a frame header and is provided at the head of a frame.

SOS: Acronym for Start Of Scan. A marker indicating the start of scan parameters.

Data: Indicates an image data code.

RST0, RST1, etc.: Indicates a resynchronization code.

FIG. 2C is a diagram showing a structure of a frame header. The meanings of the abbreviations shown in FIG. 2C are as follows:

Lf: Indicates the number of bytes of all parameters including Lf.

P: Indicates the number of bits per pixel of an input image. Here, P is assumed to be eight.

Y: Indicates the number of lines of an image. The number of lines ranges from 0 to 65,535.

X: Indicates the number of pixels of one line. The number of pixels ranges from 1 to 65,535.

Nf: Indicates the number of color components in a frame.

CSP: Indicates the parameter groups of components. Indicates a component number, the horizontal sampling ratio of a color component, the vertical sampling ratio of a color component, the number of a quantization table used by a color component, etc.

FIG. 2D is a diagram showing the exterior of a common MFP capable of copying, scanning, and printing on paper of up to A3 size. Further, FIG. 2E is a diagram showing the exterior of a wide multi-function digital copier.

The MFP of FIG. 2D includes the units of an automatic document feeder ADF, an operations board (panel) OPB, a scanner SCR, a printer PTR, a stapler, a finisher with a tray capable of carrying paper on which an image is created, and a paper feed bank. An image data processor (not graphically illustrated) is connected to an external apparatus such as a personal computer through a LAN (Local Area Network).

Paper subjected to printing in the printer PTR is ejected onto a paper ejection tray or to the finisher.

Referring to FIG. 2E, the wide MFP includes a document feeder DF, an operations board (panel) OPB, a scanner SCR, and a printer PTR. The wide MFP of FIG. 2E is capable of copying, scanning, and printing on paper of up to A0 size with respect paper of standard size. Further, the wide MFP of FIG. 2E also supports nonstandard-size elongated paper, and is capable of copying, scanning, and printing on paper of up to A0 width (841 mm) and 15 m long. In the MFP for up to A3 size paper shown in FIG. 2D, when an original material such as a document is placed on the automatic document feeder ADF, the size of the document is automatically detected by a sensor provided on the automatic document feeder ADF. In the wide MFP of FIG. 2E, however, the document may be too large in size to be automatically detected by a sensor. Accordingly, a user specifies the size of the document on the operations board OPB in advance or the wide MFP determines the size of the document by the input document size after reading the document. The wide MFP reads elongated documents of various sizes up to 15 m in length. Accordingly, the wide MFP often determines the length of an input document after actually reading the document.

Next, a description is given, with reference to FIGS. 3A and 3B, of a scanning method in the case where the size of a document is specified by a user so that the length of the document is known in advance in the wide MFP. A scanner application codes an image into general-purpose format such as JPEG or a Tagged Image File Format (TIFF). Here, a color image is coded into JPEG format.

FIG. 3A is a diagram showing a flow of image data in the case of performing scanning with the configuration shown in 1A. FIG. 3B is a flowchart showing a processing flow in this case.

Referring to FIGS. 3A and 3B, in step S101, when reading of a document is started, the RGB data of the image of the document read by the reading unit 1 are transmitted to the SBU 2 and the IPU 3 so as to be subjected to scanner correction in the IPU 3, and the RGB data are thereafter transmitted to the CDIC 4, the parallel bus 10, and the IMAC 11 to be stored in the MEM 14 as indicated by path P101 in FIG. 3A. This operation continues until the reading of the document ends.

If it is determined in step S101a that the reading of the document is completed (YES in step S101a), in step S102, the RGB image stored in the MEM 14 is converted into a JPEG code through processing by the system controller 12 as indicated by path P102 in FIG. 3A. JPEG conversion is performed after completion of the reading of the original image in order to establish coordination with the operation in the case where the number of lines is unknown.

If it is determined in step S102a that the JPEG coding is completed (YES in step S102a), in step S103, the JPEG code is stored in the HDD 13 as indicated by path P103 in FIG. 3B. Here, the JPEG code may be transmitted to an external apparatus such as a personal computer (PC) through the network 15.

Next, with reference to FIGS. 4A and 4B, a description is given of a scanning method in the case where the number of lines of an original document cannot be specified in advance, such as in the case of an elongated document.

FIG. 4A is a diagram showing image paths at the time of scanning in the case the number of lines of an original document cannot be specified in advance, such as in the case of an elongated document. FIG. 4B is a flowchart showing a processing flow in this case.

Referring to FIGS. 4A and 4B, in step S201, when reading of a document is started, the RGB data of the image of the document read by the reading unit 1 are transmitted to the SBU 2 and the IPU 3 so as to be subjected to scanner correction in the IPU 3, and the RGB data are thereafter transmitted to the CDIC 4, the parallel bus 10, and the IMAC 11 to be stored in the MEM 14 as indicated by path P201 in FIG. 4A. This operation continues until the reading of the document ends.

If it is determined in step S201a that the reading of the document is completed (YES in step S201a), in step S202, the number of input lines is counted in the CDIC 4, and this information (the counted number of input lines) is read by the process controller 22 as indicated by path P202 in FIG. 4A.

Next, in step S203, this number of lines is transmitted to the system controller 12 as indicated by path P203 in FIG. 4A. Then, in step S204, the RGB image stored in the MEM 14 is converted into a JPEG code through processing by the system controller 12 using the transmitted number of lines as indicated by path P204 in FIG. 4A.

If it is determined in step S204a that the JPEG coding is completed (YES in step S204a), in step S205, the JPEG code is transferred from the MEM 14 to the HDD 13 so as to be stored in the HDD 13 as indicated by path P205.

However, the above-described conventional scanning method of the wide MFP has the following problems.

First, there is a problem in the capacity of the MEM 14. Here, consideration is given to the case of an A0-size document and the case of an elongated document. For comparison, the case of an A3-size document, which is the maximum document size of an A3 MFP, is also shown. The document is read with a resolution of 600 dpi (dot per inch). The document is a color document (RGB) of eight bits per pixel. Since the maximum number of lines of a JPEG code is 65,535, the number of lines of the elongated document is assumed to be 65,535. At a resolution of 600 dpi, 65,535 lines correspond to 2,774 mm. Memory capacity required in each case is as shown in TABLE 1 below.

TABLE 1

| DOCUMENT | SIZE (MAIN SCANNING DIRECTION × SUB SCANNING DIRECTION) | PIXEL NUMBER × LINE NUMBER | REQUIRED MEMORY CAPACITY |
| --- | --- | --- | --- |
| A3 | 297 mm × 420 mm | 7,016 × 9,921 | 199 MB |
| A0 | 841 mm × 1189 mm | 19,866 × 28,087 | 1596 MB (ABOUT 1.6 GB) |
| ELONGATED | 841 mm × 2774 mm | 19,866 × 65,535 | 3725 MB (ABOUT 3.7 GB) |

The memory capacity required for the A3-size document is 199 MB, which is not large. However, the A0-size document and the JPEG-codable elongated document require considerably large memory capacities of about 1.6 GB and 3.7 GB, respectively. The capacity of a memory provided in the controller of the MFP ranges from 378 MB to 2 GB. With the program and data area and work area of the system controller 12 being reserved, the memory capacity usable for the scanner application is approximately 1 GB. This is too small even for the A0-size document, and allows only a document up to as large as about A1 in size, which is the half of A0.

In the case of performing coding, the coding is started after the reading of the document is completed so that the size of the document is determined. A description is given of time for reading the document. The wide MFP is assumed to have a relatively high document reading rate of 100 mm/s, which means reading a wide document 100 mm per second. The document reading rate in each case is shown in TABLE 2 below.

TABLE 2

| DOCUMENT | SIZE (MAIN SCANNING DIRECTION × SUB SCANNING DIRECTION) | TIME REQUIRED FOR READING DOCUMENT |
|---|---|---|
| A3 | 297 mm × 420 mm | 4.2 s |
| A0 | 841 mm × 1189 mm | 11.9 s |
| ELONGATED | 841 mm × 2774 mm | 27.7 s |

Next, consideration is given to the rate of coding (compression) by an X86 processor (1 GHz). Letting the compression rate by the X86 processor be, for example, approximately 45 MB/s, the compression time in each case is as shown in TABLE 3 below.

TABLE 3

| DOCUMENT | SIZE (MAIN SCANNING DIRECTION × SUB SCANNING DIRECTION) | IMAGE CAPACITY | COMPRESSION TIME |
|---|---|---|---|
| A3 | 297 mm × 420 mm | 199 MB | 4.4 s |
| A0 | 841 mm × 1189 mm | 1596 MB | 35.5 s |
| ELONGATED | 841 mm × 2774 mm | 3725 MB | 82.8 s |

Next, a description is given of the productivity of the scanner application. The productivity of the scanner application is defined by SPM (Scan Per Minute), which is the number of sheets read per minute. The time required for coding a sheet of the document is a reading time plus a compression time. Accordingly, the productivity of the scanner application in each case is as shown in TABLE 4 below.

TABLE 4

| DOCUMENT | SIZE (MAIN SCANNING DIRECTION × SUB SCANNING DIRECTION) | READING TIME + COMPRESSION TIME | SCANNER PRODUCTIVITY |
|---|---|---|---|
| A3 | 297 mm × 420 mm | 8.6 s | 7.0 SPM |
| A0 | 841 mm × 1189 mm | 47.4 s | 1.3 SPM |
| ELONGATED | 841 mm × 2774 mm | 110.5 s | 0.5 SPM |

Thus, the productivity per minute is 7.0 SPM in the case of the A3-size document. However, in the case of the A0-size document, the productivity per minute is 1.3 SPM, so that only a little more than one sheet can be read per minute. Further, in the case of the elongated document, the productivity per minute is 0.5 SPM, so that approximately two minutes are required to process one sheet. A user has to wait this much time before completion of reading the document after the document is set, which is extremely inconvenient for the user. The above is the case of reading the document at 600 dpi. If the resolution is reduced to 300 dpi, the amount of data is reduced, so that the productivity increases. However, it is necessary to read a document drawn with fine lines, such as a design drawing, with a high quality of 600 dpi. In this case, the above-described problem occurs. In the case of a document whose size is not specified and is unknown, the number of lines is not determined and thus coding of an image cannot be started before completion of reading of the document, thus preventing productivity from increasing.

SUMMARY OF THE INVENTION

Embodiments of the present invention may solve or reduce the above-described problem.

According to one embodiment of the present invention, a reader apparatus is provided in which the above-described problem may be eliminated or reduced.

According to one embodiment of the present invention, coding is performed at higher rates at the time of scanning in wide MFPs.

According to one embodiment of the present invention, a reader apparatus is provided including a reading part configured to read an image of an original material; a coding part configured to code data of the read image of the original material; an image memory configured to contain the coded data of the image of the original material; and a controller configured to control the reading of the image of the original material and the coding of the data of the image of the original material, wherein the coding part includes a counting part configured to count a number of lines of the image of the original material, the number of lines indicating a size of the image of the original material in an original material feed direction in which the original material is fed; a provisional coding part configured to code the data of the image of the original material with a provisional number of lines in response to the size of the image of the original material in the original material feed direction being unknown; and a determination part configured to determine the number of lines of the image of the original material at an end of the reading of the image of the original material, and the controller includes a replacement part configured to replace the provisional number of lines in the coded data with the determined number of lines.

According to one embodiment of the present invention, a reading method is provided including reading an image of an original material, whose number of lines indicating a size of the image in a direction in which the original material is fed is unknown, while counting the number of lines; coding data of the read image of the original material with a provisional number of lines, and storing the coded data in an image memory; and upon determination of the number of lines of the image of the original material at an end of the reading of the image of the original material, generating a header part containing the determined number of lines, and replacing a header part of the coded data stored in the image memory with the header part containing the determined number of lines.

According to one aspect of the present invention, it is possible to simultaneously read and code the image of an original material whose size in the original material feed direction is unknown, so that it is possible to reduce necessary memory capacity and to improve reading productivity.

BRIEF DESCRIPTION OF THE DRAWINGS

Other objects, features and advantages of the present invention will become more apparent from the following detailed description when read in conjunction with the accompanying drawings, in which:

FIGS. 2A through 2E are diagrams for illustrating JPEG coding in the conventional image processor;

FIG. 6A is an image diagram showing reading of a standard-size document in the document reader according to the embodiment of the present invention;

FIG. 8B is a flowchart showing a processing flow in the case of FIG. 8A according to the embodiment of the present invention;

DETAILED DESCRIPTION OF THE PREFERRED EMBODIMENTS

Figure 1A:
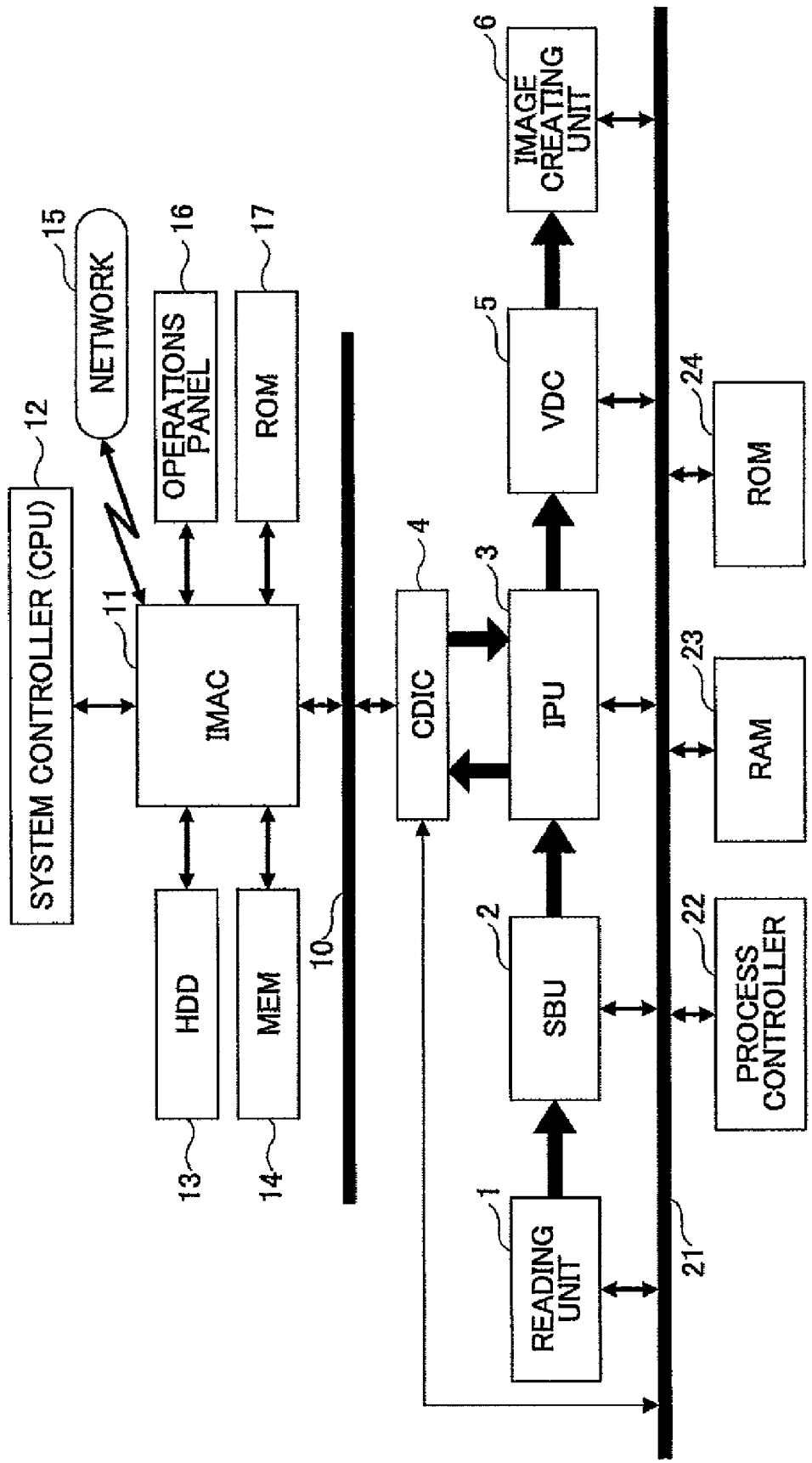
FIGS. 1A through 1E are functional block diagrams of a conventional image processor.
Figure 1B:
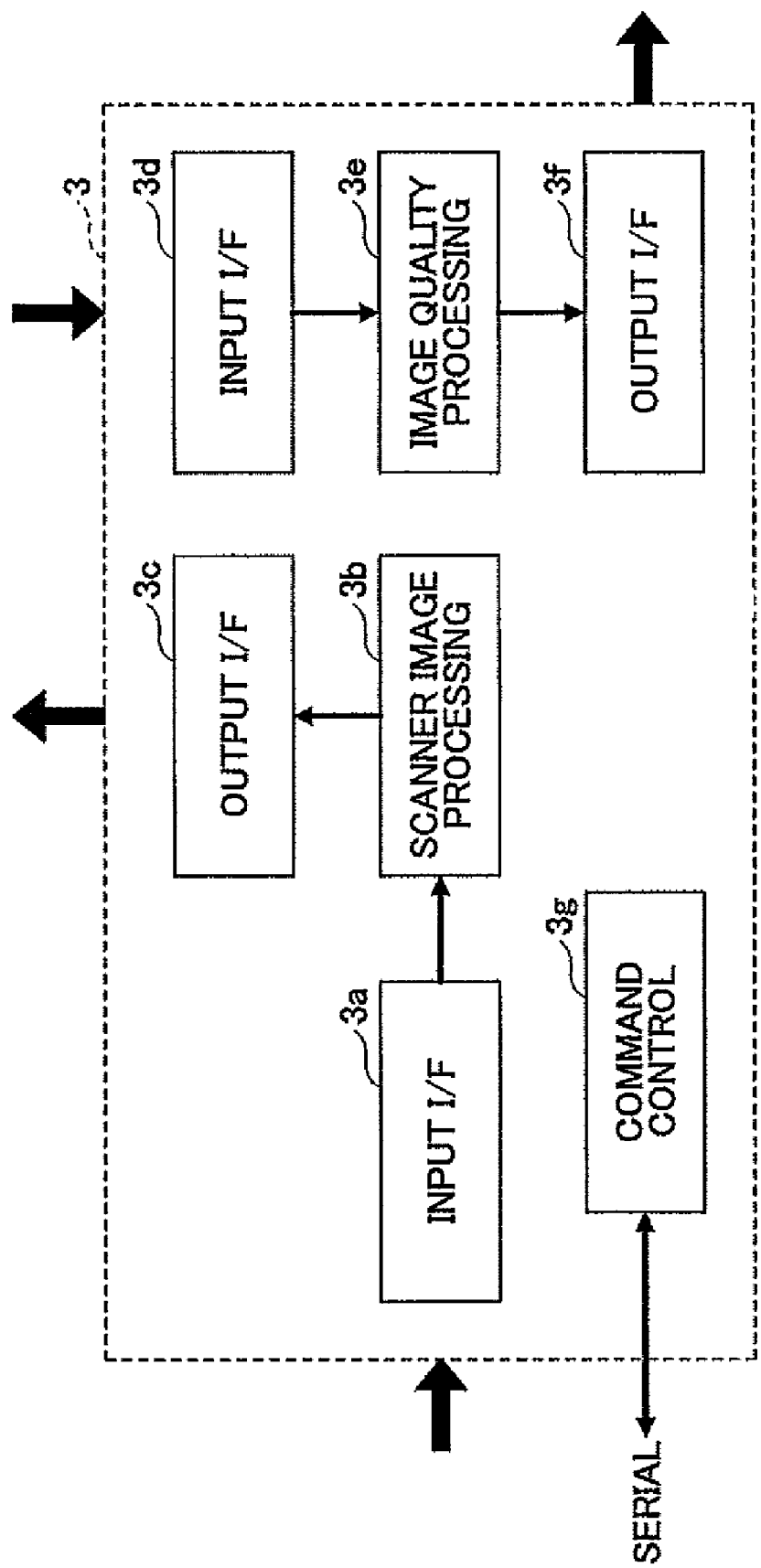
Figure 1C:
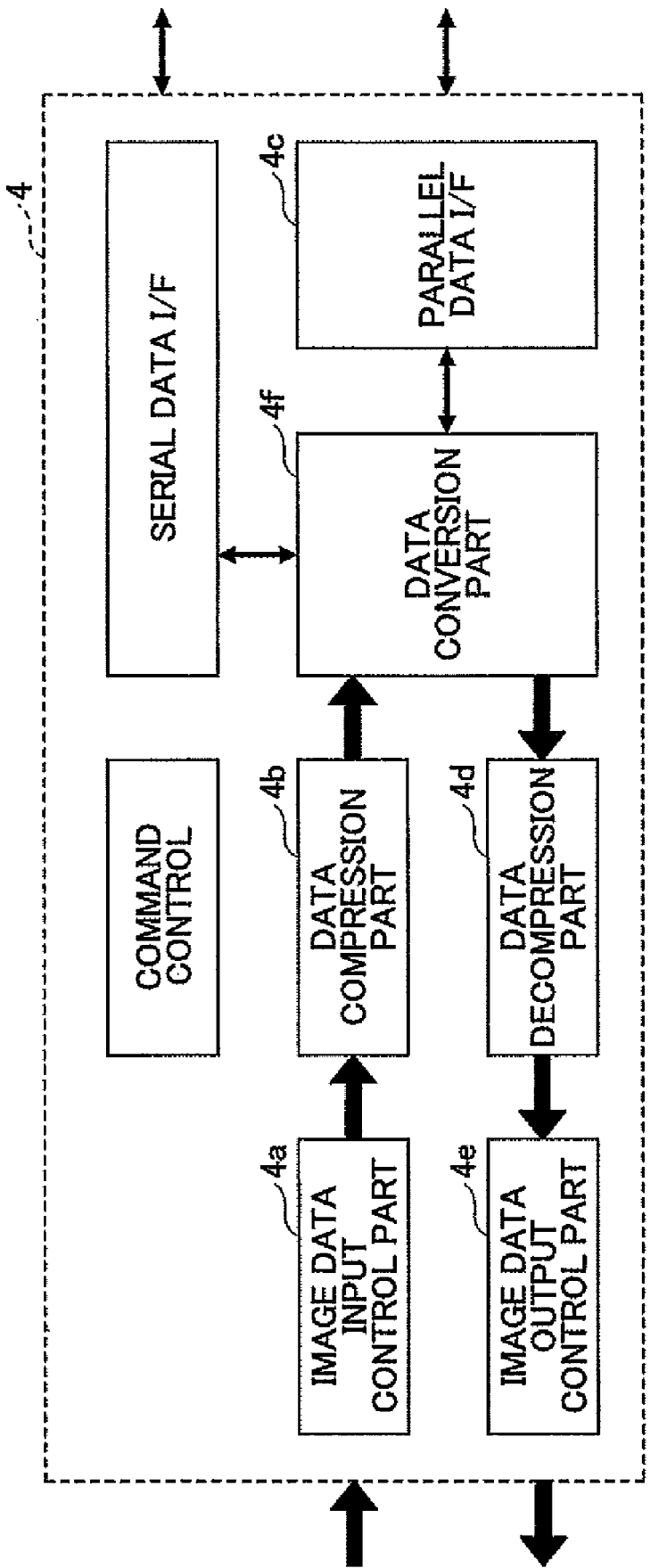
Figure 1D:
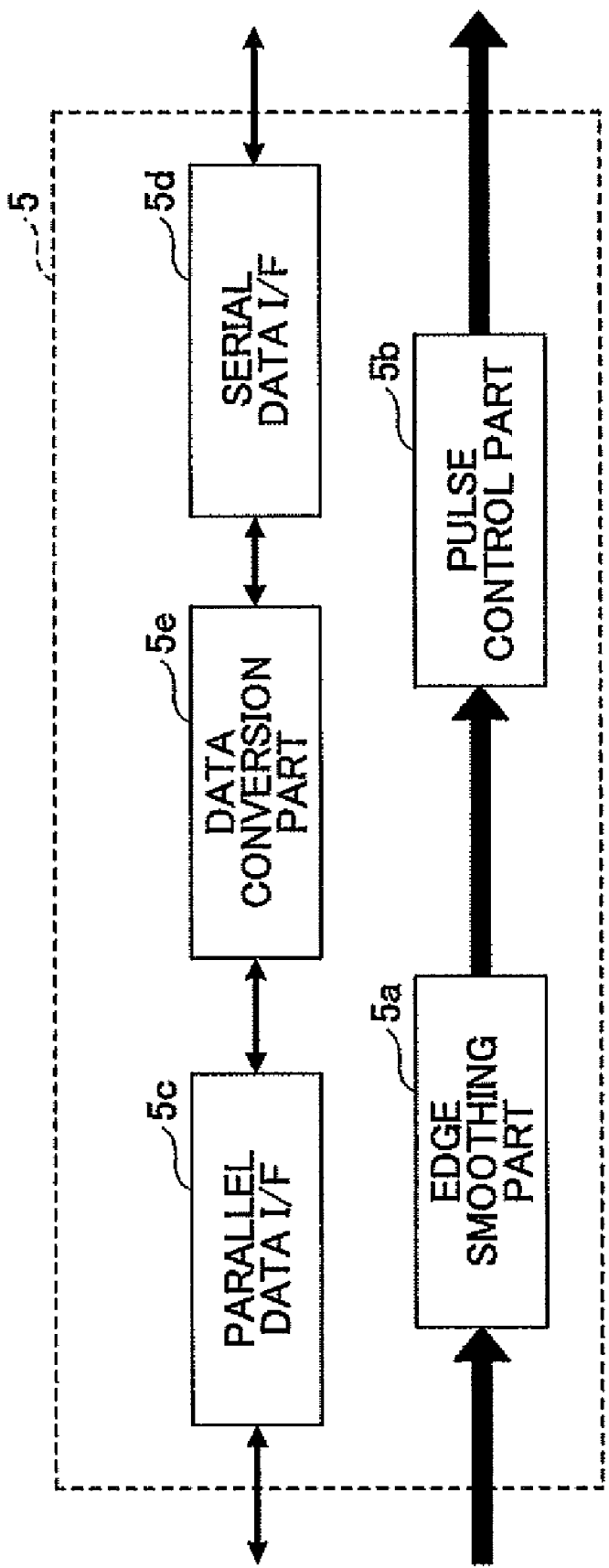
Figure 1E:
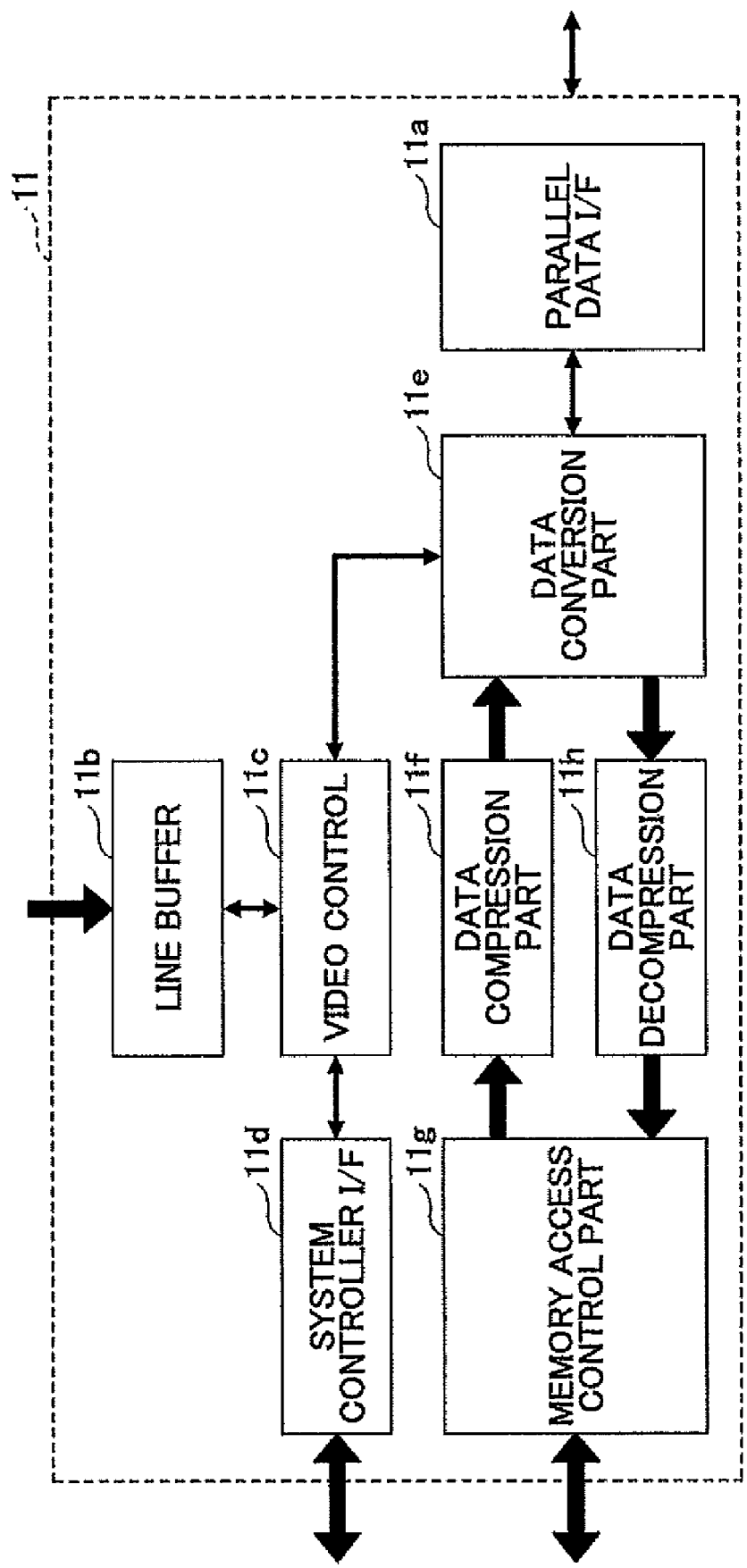

A description is given below, with reference to the accompanying drawings, of an embodiment of the present invention.

Embodiment

According to an embodiment of the present invention, a reader apparatus is provided that codes image data with a provisional number of lines and stores the coded image data in an image memory while reading an original material (such as a document) of unknown size, and replaces a header of the provisional number of lines with a header of a determined number of lines at the end of the reading of the original material.

In the following description, a document is taken as an example of the original material to be read, and a document reader is taken as an example of the reader apparatus. Further, the same elements as those described above are referred to by the same reference numerals.

FIGS. 5A through 5D are conceptual diagrams of an image processing system having a document reader (reader apparatus) according to the embodiment of the present invention. The image processing system of this embodiment has the same basic configuration as the conventional system configuration shown in FIG. 1A, but is different from the conventional system configuration shown in FIG. 1A in having an image coding module (ICM) 7 and a buffer memory (BMEM) 8 provided between the IPU 3 and the CDIC 4.

Figure 5A:
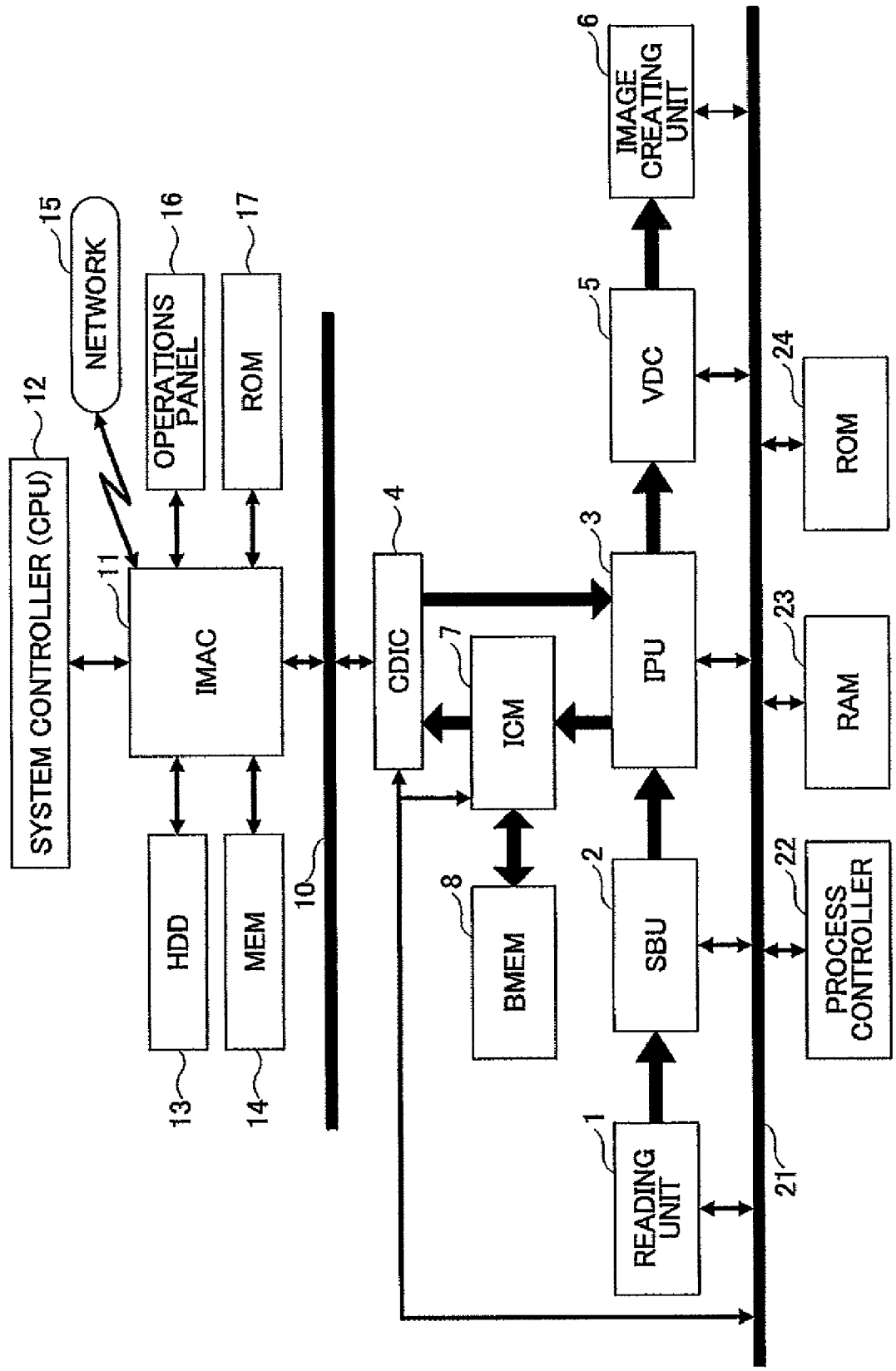
FIG. 5A is a functional block diagram showing an image processing system including a document reader according to an embodiment of the present invention.
Figure 5B:
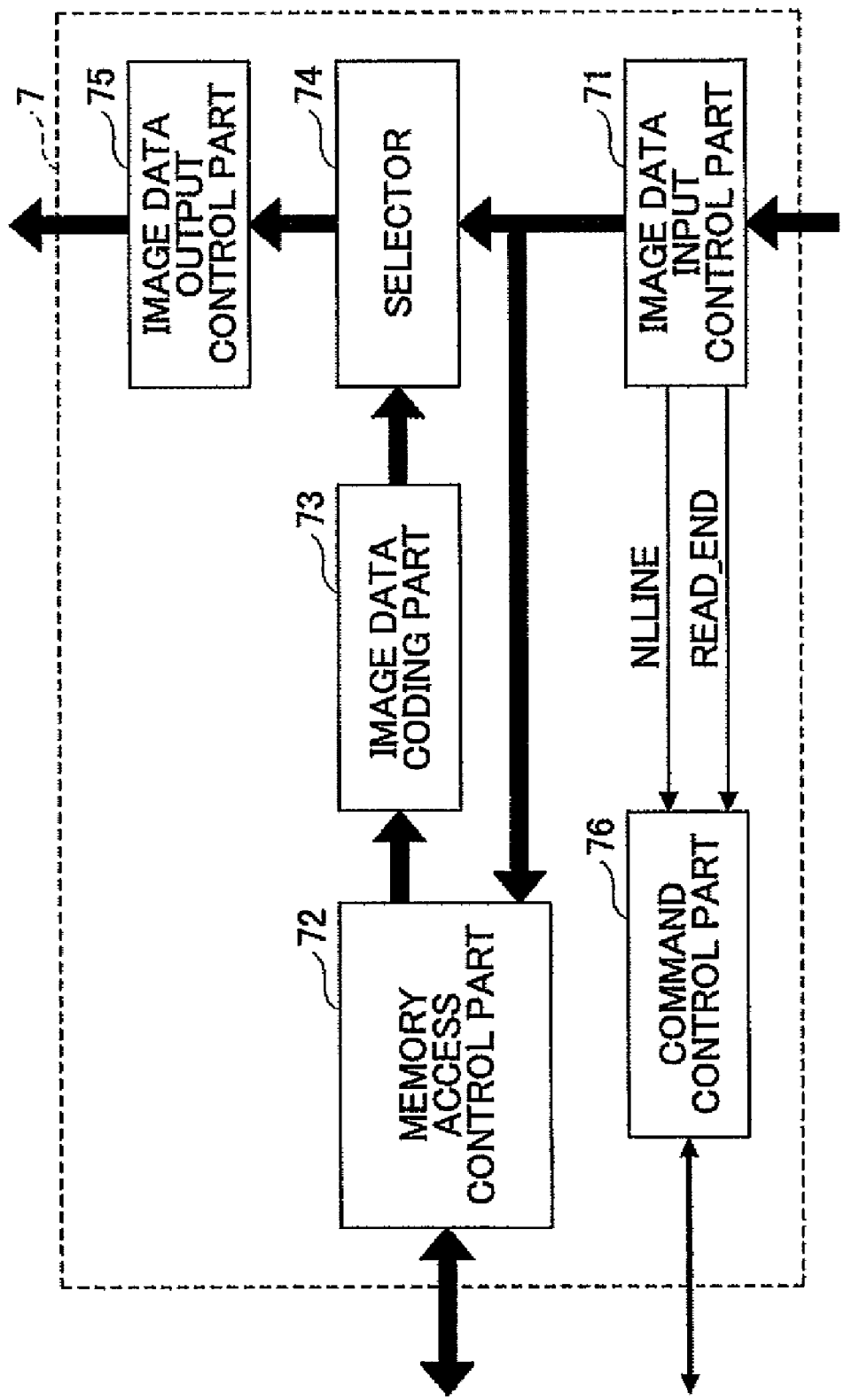
FIG. 5B is a functional block diagram showing an image coding module ICM according to the embodiment of the present invention.
Figure 5C:
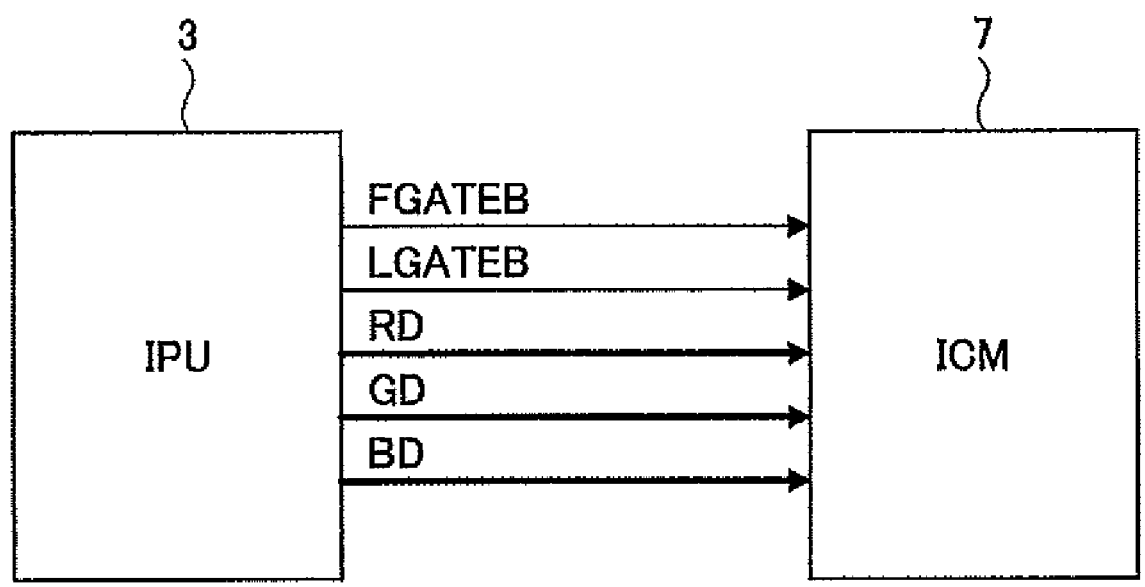
FIG. 5C is a diagram showing signals input to the ICM from an image processing unit IPU according to the embodiment of the present invention.
Figure 5D:
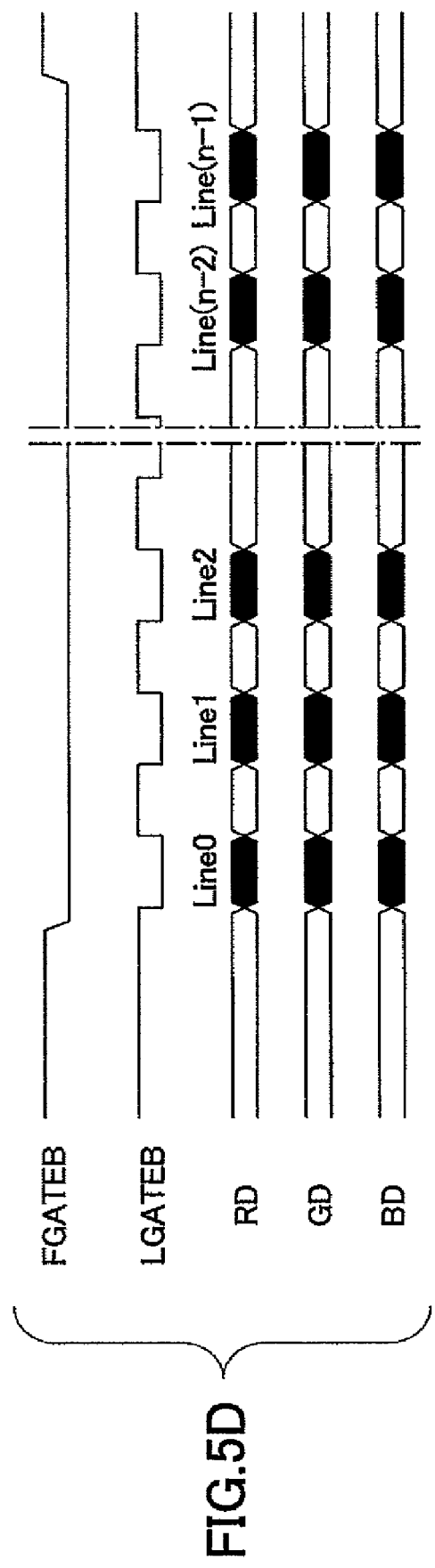
FIG. 5D is a timing chart of the signals of FIG. 5C according to the embodiment of the present invention.

FIG. 5A is a functional block diagram of the image processing system according to this embodiment. FIG. 5B is a functional block diagram showing a configuration of the ICM 7 according to this embodiment. FIG. 5C is a diagram showing signals input to the ICM 7 from the IPU 3 according to this embodiment. FIG. 5D is a timing chart of the signals of FIG. 5C according to this embodiment.

Referring to FIG. 5A, the reading unit 1 is a scanner that reads a document. The SBU (sensor board unit) 2 converts a read image from an analog signal into a digital signal. The IPU (image processing unit) 3 performs correction and image quality processing on the scanned image. The CDIC (image data controller) 4 performs compression and decompression and data conversion. The VDC (video data controller) 5 performs image processing according to the image creating unit 6. The image creating unit 6 is, for example, a printer that visualizes image data as an image. The ICM 7 codes image data. The BMEM 8 is a temporary storage for image data. The parallel bus 10 is a common bus for transferring data such as image data in parallel.

The IMAC (image memory access controller) 11 compresses and decompresses image data and accesses image memory. The system controller (CPU) 12 controls the entire system and manages activation of resources. The HDD 13 is a file device in which image data are stored. The MEM 14 is a memory in which image data are stored. The network 15 is a communications network such as a LAN or the Internet. The operations panel 16 is an input/output part for a user to operate the apparatus. The ROM 17 is a fixed storage unit containing programs and parameters for apparatus control. The serial bus 21 is a common bus for serially transferring data such as image data. The process controller 22 controls a flow of image data. The RAM 23 is a memory in which data such as image data are temporarily stored. A ROM 24 is a fixed storage unit containing programs and parameters.

Referring to FIG. 5B, the ICM 7 includes an image data input control part 71, a memory access control part 72, an image data coding part 73, a selector 74, an image data output control part 75, and a command control part 76.

The image data input control part 71 is an image data input interface. The memory access control part 72 is an interface with the BMEM 8. The image data coding part 73 codes image data. The selector 74 is a circuit that makes selection between coded image data and input image data. The image data output control part 75 is an image data output interface. The command control part 76 notifies the process controller 22 of the input state of image data.

Figure 6B:
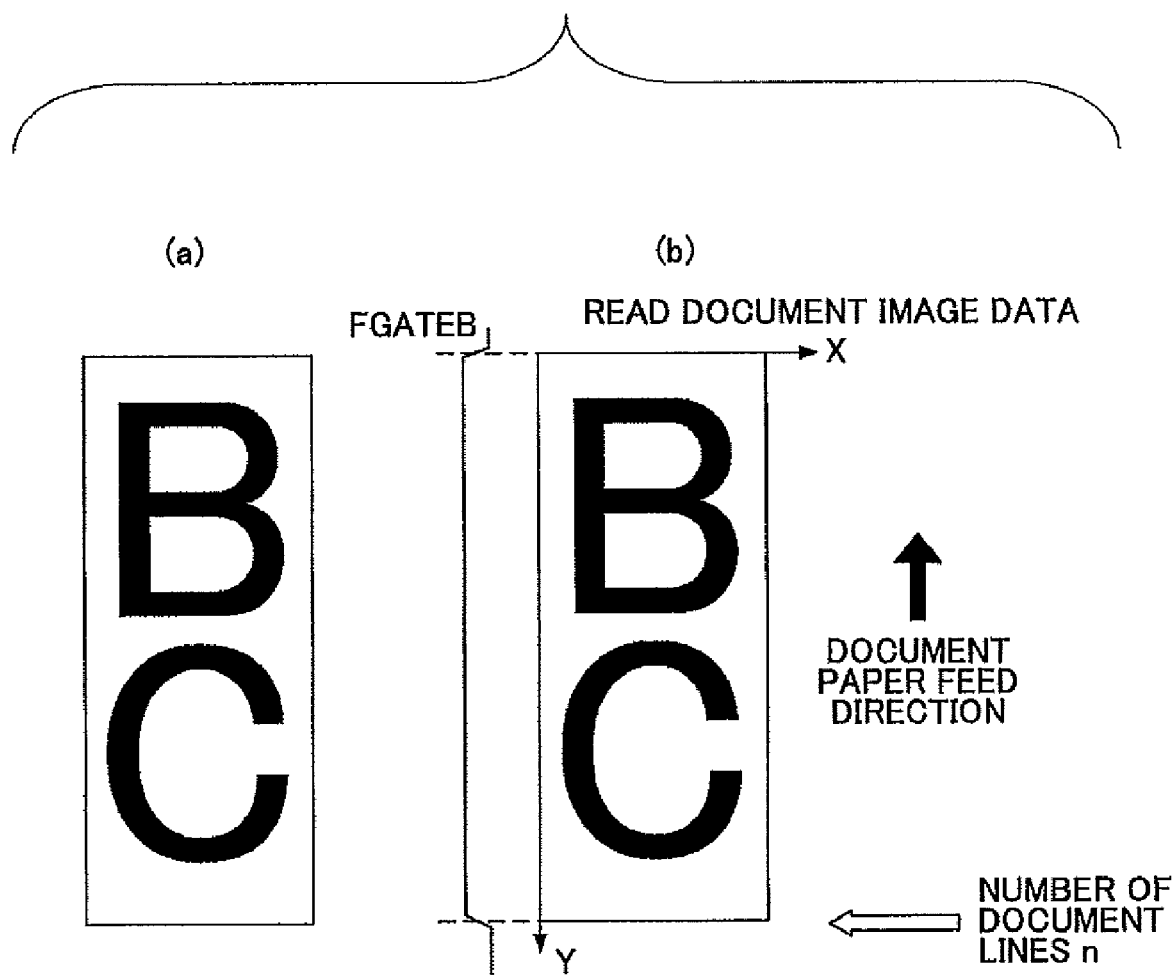
FIG. 6B is an image diagram showing reading of an elongated document in the document reader according to the embodiment of the present invention.
Figure 6C:
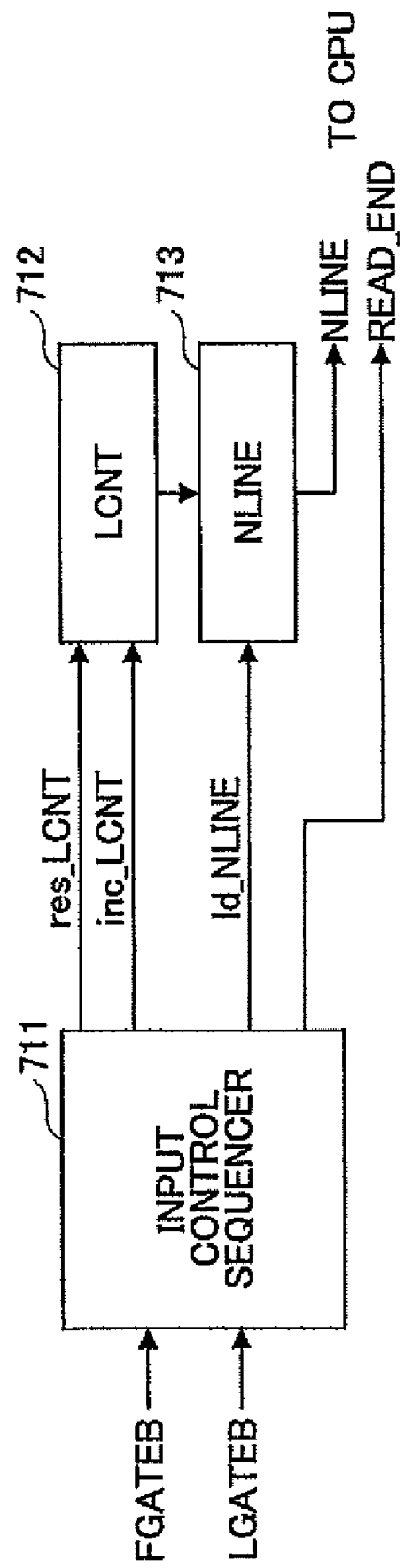
FIG. 6C is a functional block diagram showing an image data input control part of the ICM according to the embodiment of the present invention.

FIGS. 6A through 6D are diagrams for illustrating reading of a document. FIG. 6A is an image diagram showing reading of a standard-size document. FIG. 6C is an image diagram showing reading of an elongated document. FIG. 6C is a diagram showing the image data input control part 71 (FIG.

Figure 6D:
FIG. 6D is a state transition diagram of an input control sequencer of the image data input control part according to the embodiment of the present invention.

5B) that performs input control. FIG. 6D is a state transition diagram of an input control sequencer 711 of the image data input control part 71.

Figure 7A:
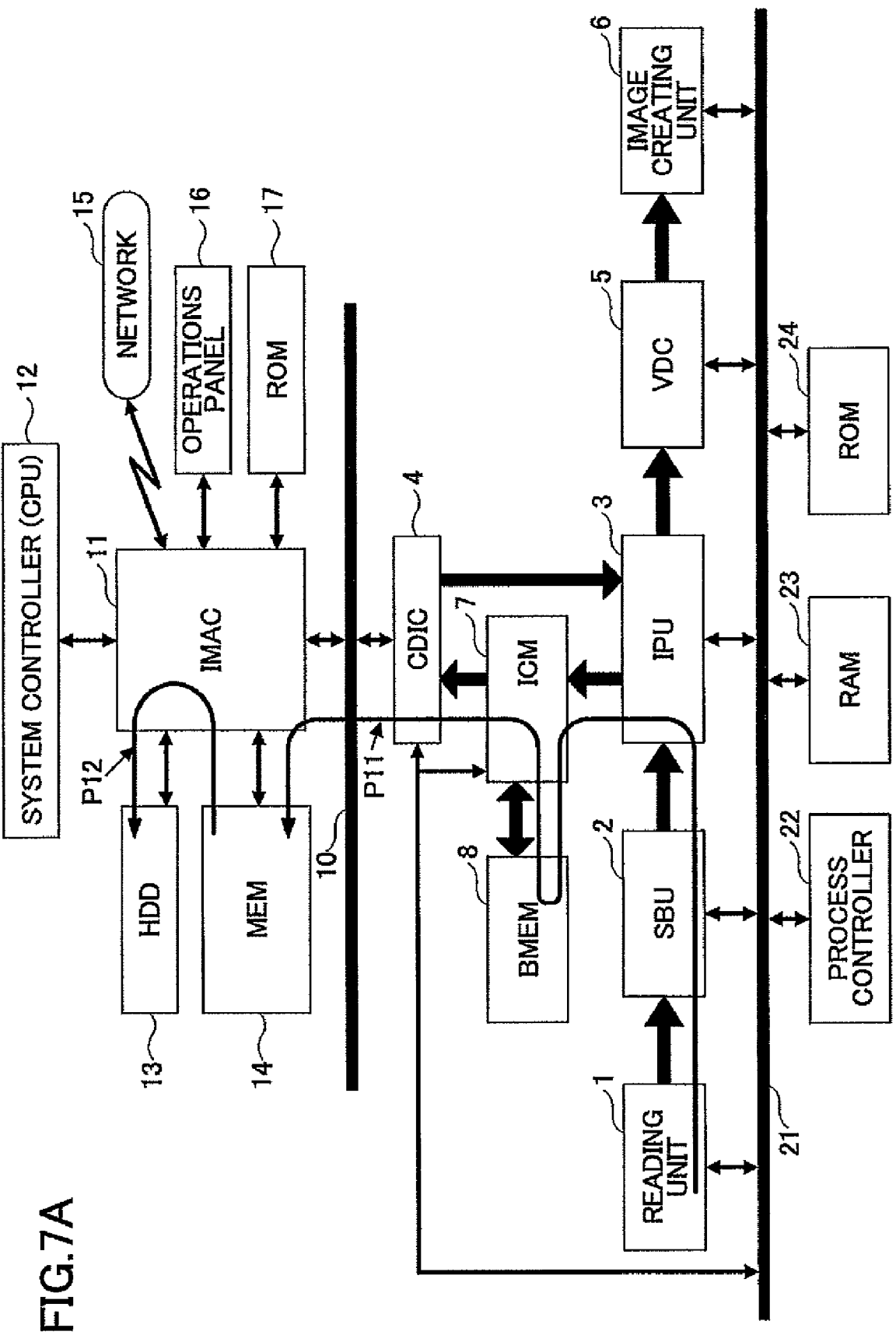
FIG. 7A is a diagram showing a flow of image data in the case of reading and coding a standard-size document in the document reader according to the embodiment of the present invention.
Figure 7B:
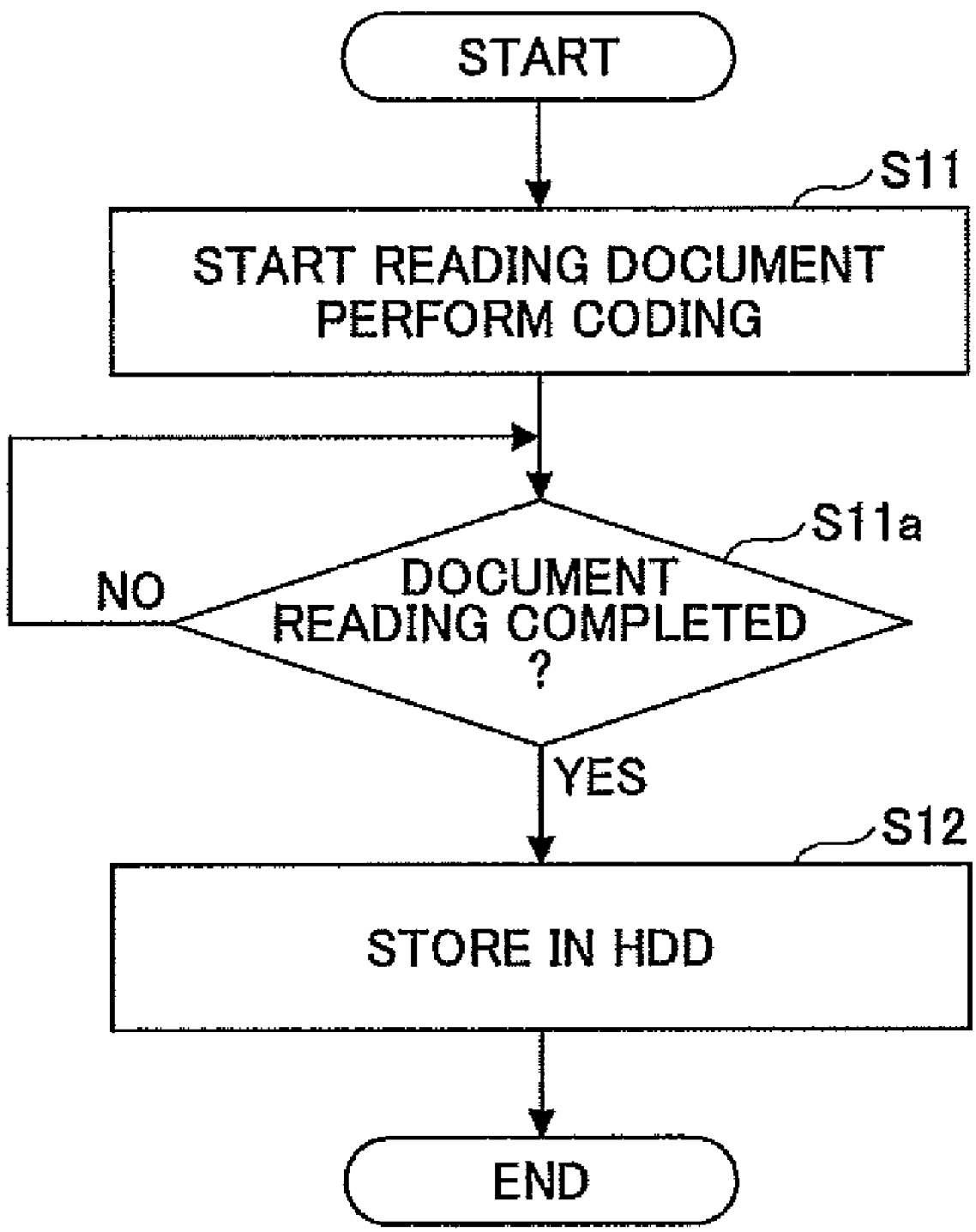
FIG. 7B is a flowchart showing a processing flow in the case of FIG. 7A according to the embodiment of the present invention.

FIGS. 7A and 7B are diagrams for illustrating a method of coding a standard-size document. FIG. 7A is a diagram showing a flow of image data in the case of reading and coding a standard-size document. FIG. 7B is a flowchart showing a processing flow in this case.

Figure 8A:
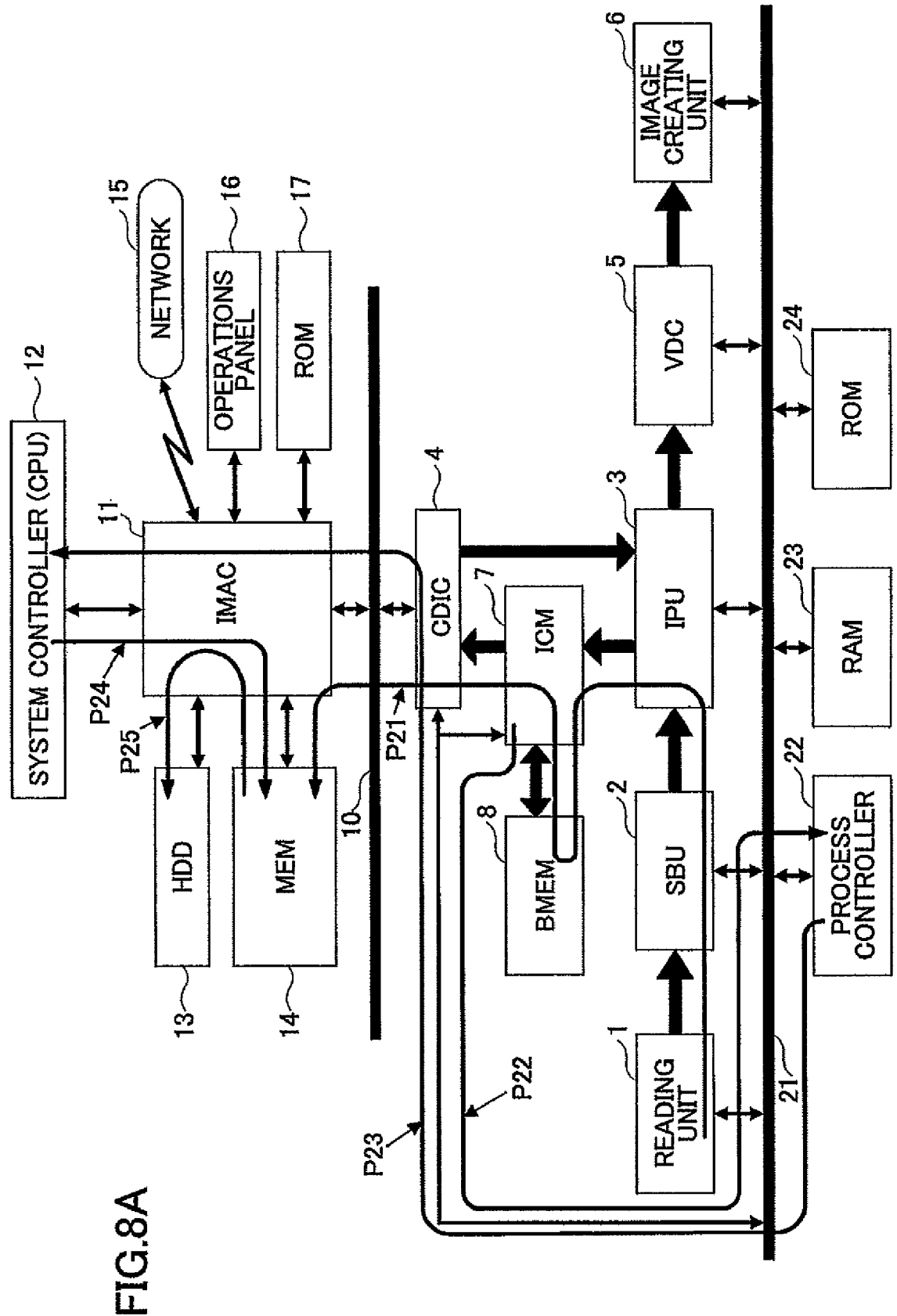
FIG. 8A is a diagram showing a flow of image data in the case of reading and coding an unknown-size document in the document reader according to the embodiment of the present invention.

FIGS. 8A and 8B are diagrams for illustrating a method of coding an unknown-size document. FIG. 8A is a diagram showing a flow of image data in the case of reading and coding an unknown-size document. FIG. 8B is a flowchart showing a processing flow in this case.

Figure 9A:
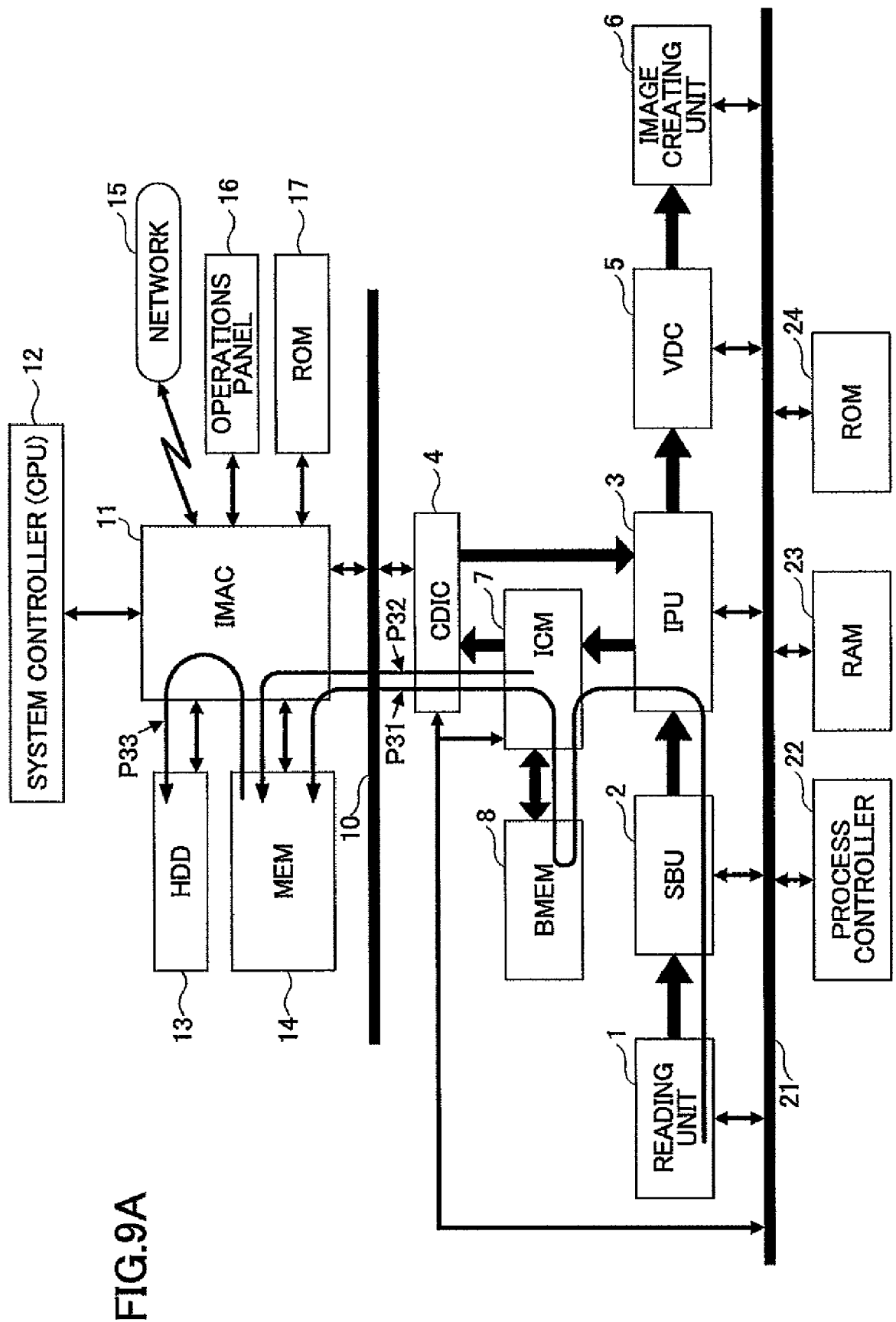
FIG. 9A is a diagram showing a flow of image data in the case of performing code generation after completion of reading in the ICM in the document reader according to the embodiment of the present invention.
Figure 9B:
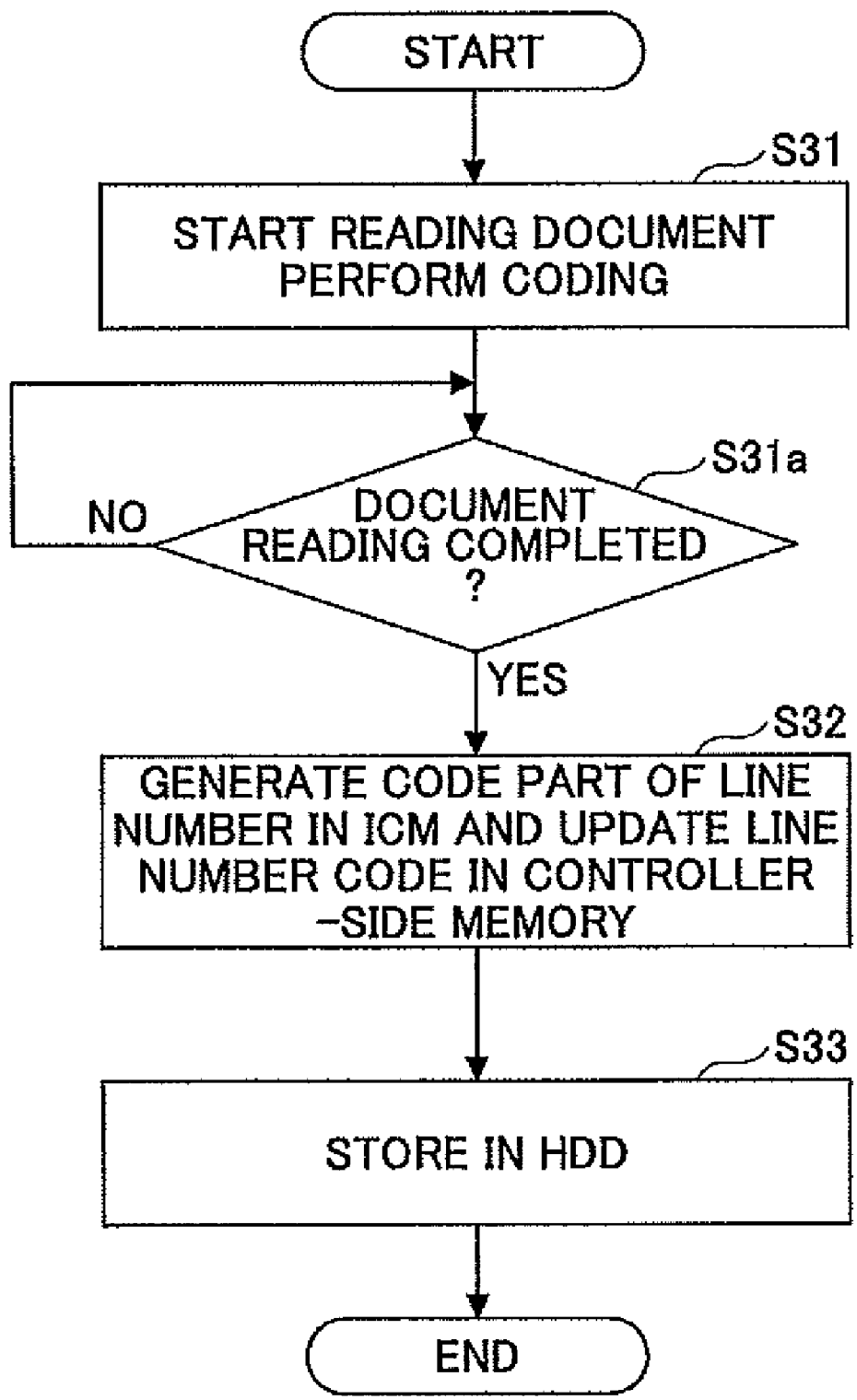
FIG. 9B is a flowchart showing a processing flow in the case of FIG. 9A according to the embodiment of the present invention.

FIGS. 9A and 9B are diagrams for illustrating another method of coding an unknown-size document. FIG. 9A is a diagram showing a flow of image data in the case of performing code generation after completion of reading in the ICM 7. FIG. 9B is a flowchart showing a processing flow in this case.

A description is given of functions and operations of the document reader configured as described above according to the embodiment of the present invention.

First, an overview is given, with reference to FIG. 5A, of functions of the document reader. The document reader of this embodiment has the same basic functions as the conventional document reader, but is different from the conventional document reader in the function related to coding of image data.

The system controller 12 and the process controller 22, which are controllers, control reading and coding of the image of a document. The document image is scanned and read by the reading unit 1, and image data are transmitted to the ICM 7 through the SBU 2 and the IPU 3. The reading unit 1, the SBU 2, and the IPU 3 may form a reading part.

The ICM 7 and the BMEM 8, which may form a coding part, code the image data and store the coded (image) data in the MEM 14, which is an image memory. At this point, if the size of the document in the document (paper) feed direction is unknown, the image data of the document are coded using a provisional number of lines for the number of lines indicating the size of the document in the paper feed direction while counting the number of lines of the document image. When the number of lines is determined at the end of the reading of the document, the header part of the provisional number of lines in the coded data is replaced with a header part of the determined number of lines. The coded image data are stored in the HDD 13, which is an image memory. The number of lines may be in a part other than the header part, and here, the term "header part" represents the parts in which the number of lines may be contained.

When the number of lines of the document image is determined, the ICM 7 notifies the process controller 22 of the determined number of lines. The system controller 12 generates a header part containing the determined number of lines. Alternatively, the ICM 7 generates a header part containing the determined number of lines, and transmits the header part containing the number of lines to the system controller 12, specifying the address of the header part containing the provisional number of lines in the MEM 14.

The ICM 7 counts (measures) the amount of the coded data, and notifies the system controller 12 of the measured amount of the coded data. When the measured amount of the coded data exceeds a preset amount of codes, the ICM 7 reports it to the system controller 12. Further, if the ICM 7 detects the occurrence of a buffer overflow due to a relative delay in coding the image data of the document, the ICM 7 notifies the system controller 12 of the occurrence of the buffer overflow. In response to reception of the notification of the occurrence of the buffer overflow, the system controller 12 notifies the operations panel 16 to display the necessity of decreasing the document reading resolution or increasing the compression rate.

Next, a description is given, with reference to FIG. 5B, of functions of the ICM 7. The image data input control part 71 functions as an input I/F for input RGB image data, and detects the number of input lines (NLINE) and the end of document reading (READ_END). These information items are transmitted from the image data input control part 71 to the command control part 76 to be reported to the process controller 22 shown in FIG. 5A.

Figure 2A:
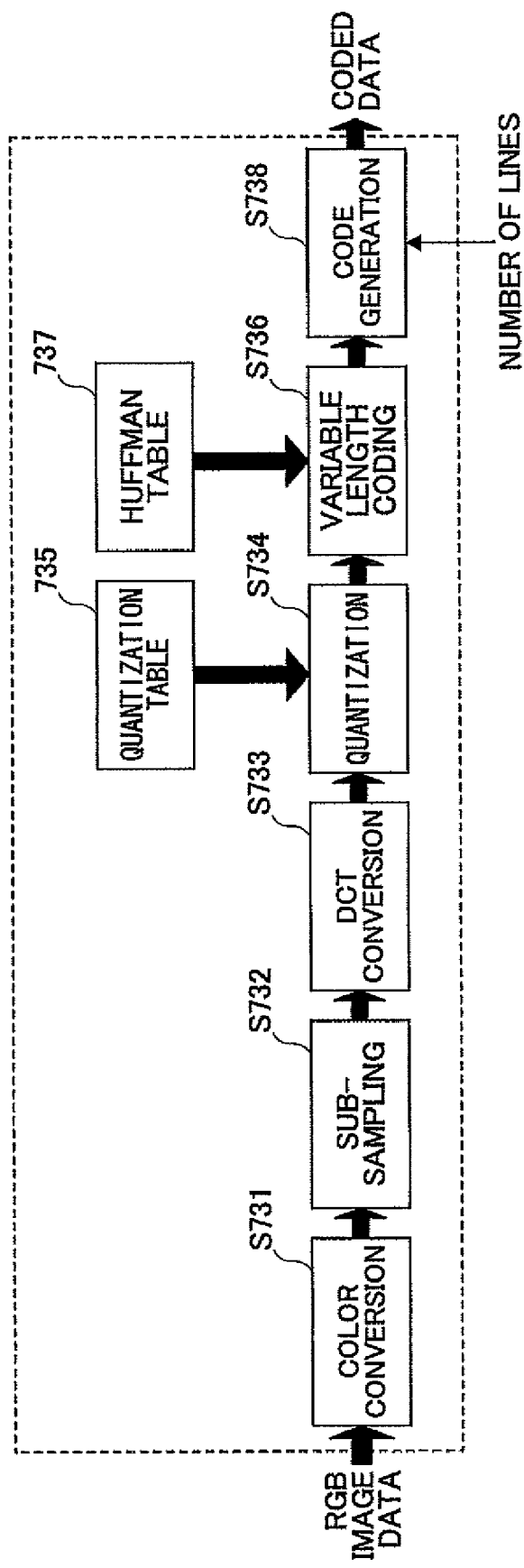
Figure 2B:
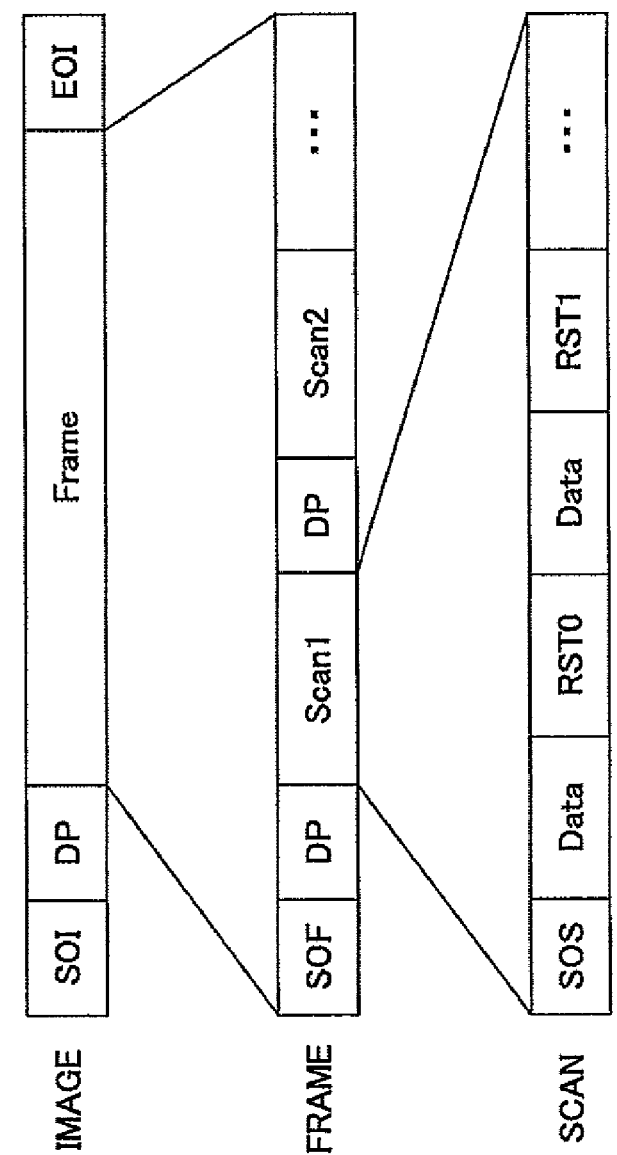
Figure 2E:
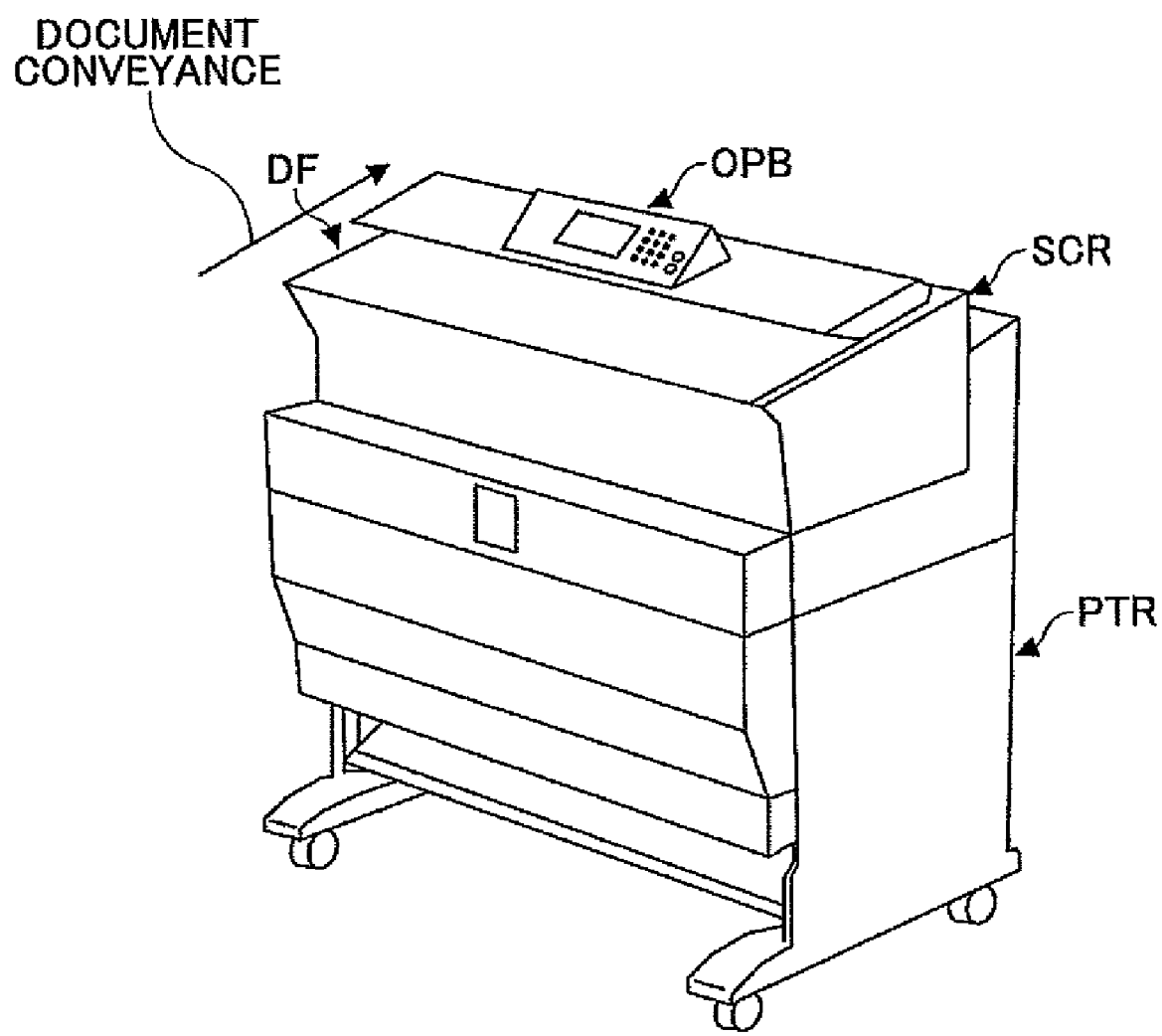
Figure 3A:
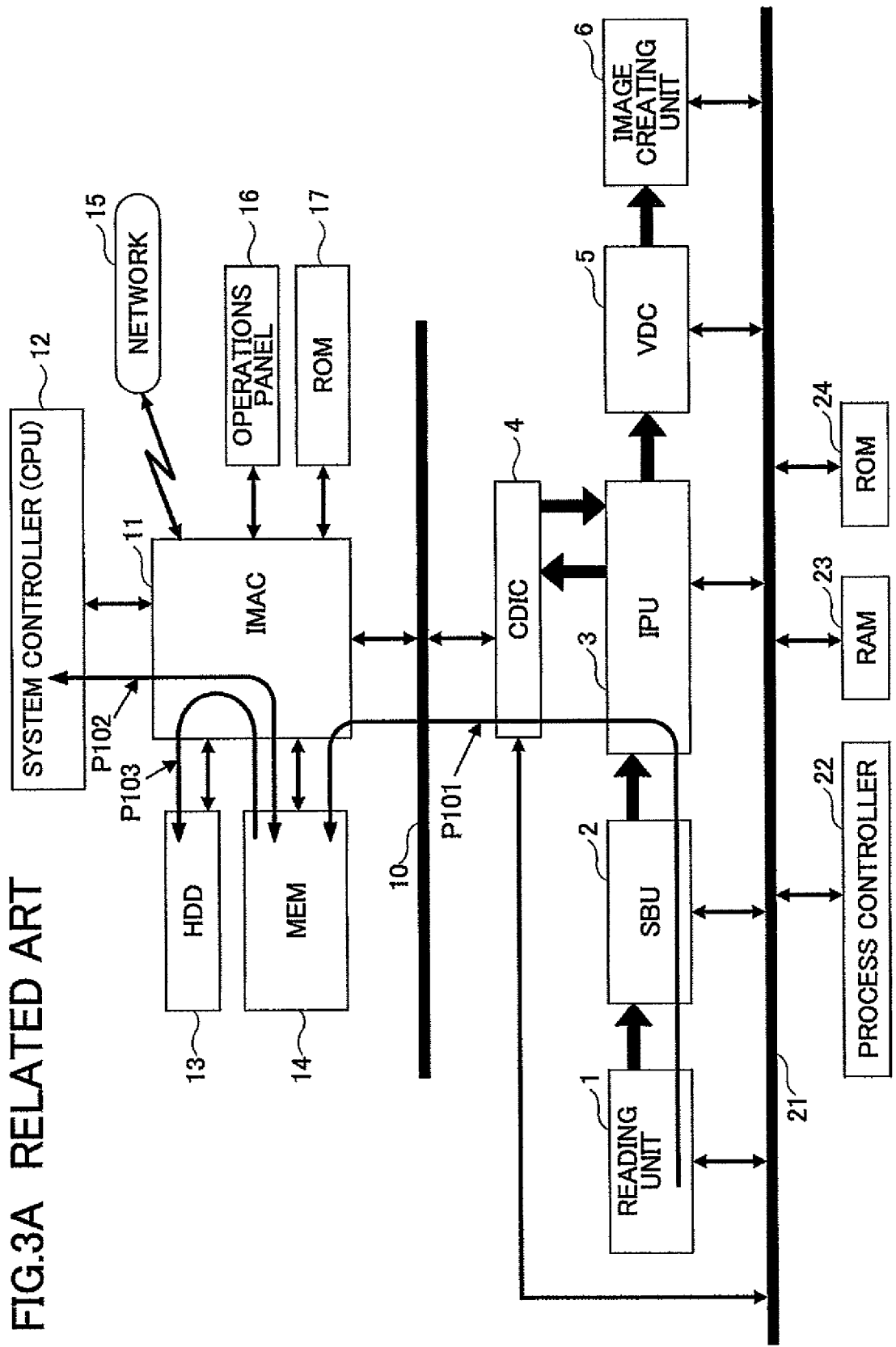
FIGS. 3A and 3B are diagrams for illustrating a scanning method in a conventional wide MFP, where a user specifies a document size.
Figure 3B:
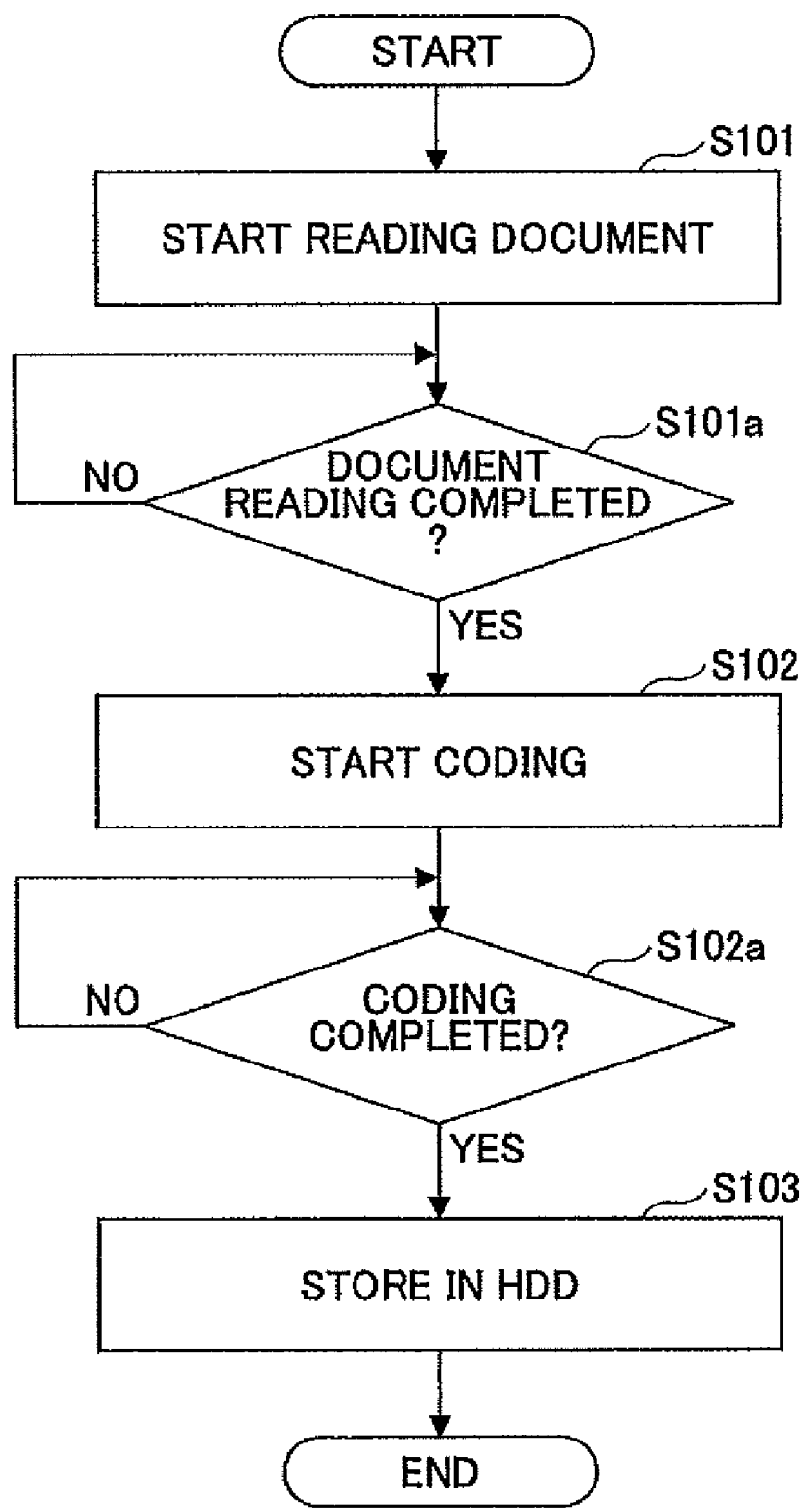
Figure 4A:
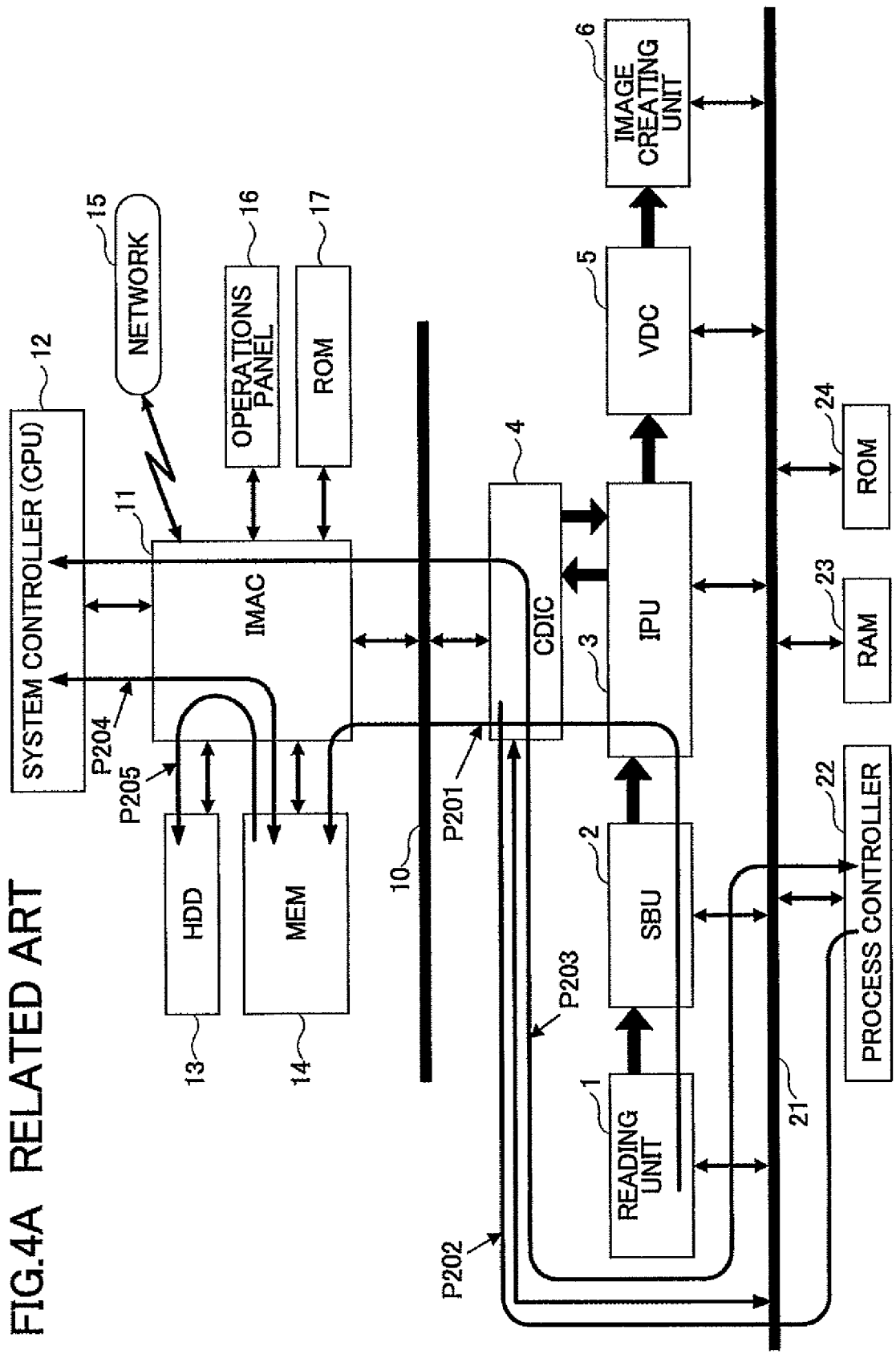
FIGS. 4A and 4B are diagrams for illustrating a scanning method in the conventional wide MFP, where the number of lines of a document cannot be specified in advance.
Figure 4B:
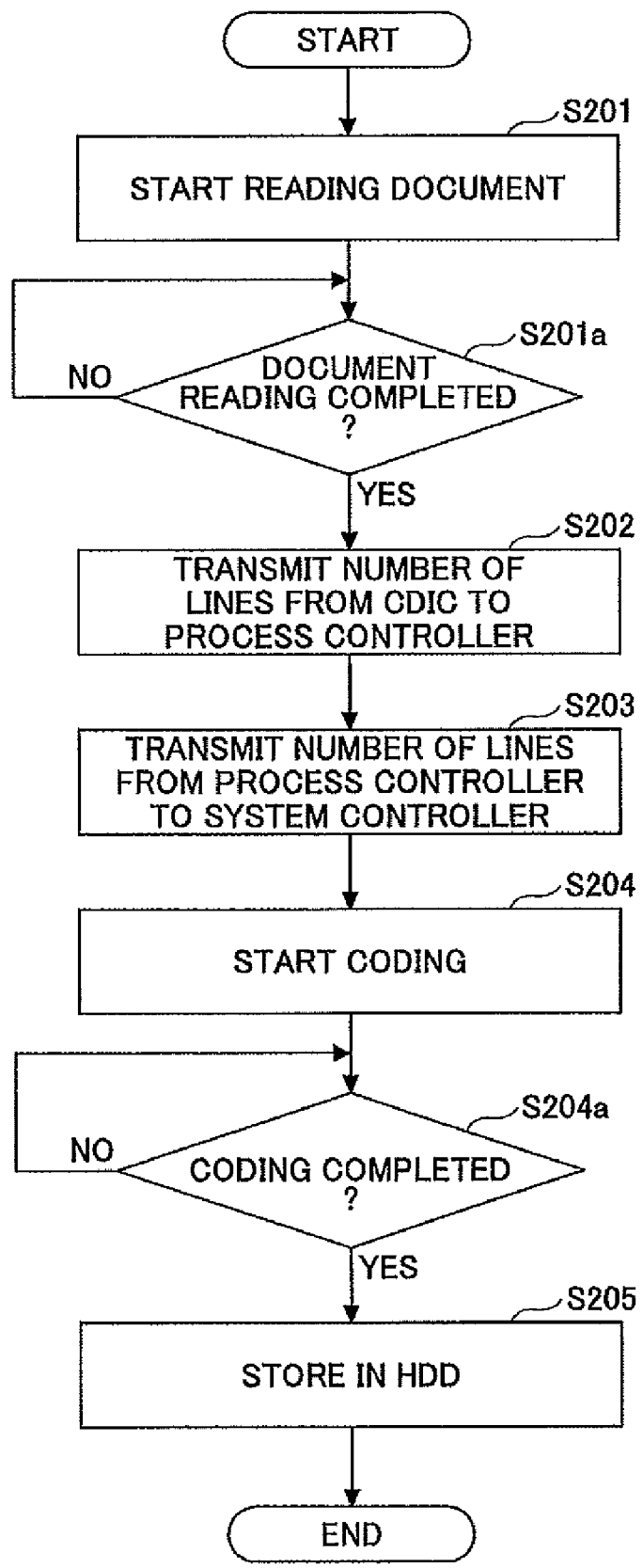

The memory access control part 72 writes image data output from the image data input control part 71 onto the external BMEM 8. At the start of coding, the memory access control part 72 reads the image data from the BMEM 8 and outputs the read image data to the image data coding part 73. The image data coding part 73 codes the image data input from the memory access control part 72, and outputs the coded image data to the selector 74. In the case of adopting common JPEG coding as a coding method, the processing flow is as shown in FIG. 7B, and the code structure is as shown in FIGS. 2B and 2C.

At the time of coding, the selector 74 selects the coded data from the image data coding part 73 and outputs the coded data to the image data output control part 75. When no coding is performed, the selector 74 selects image data from the image data input control part 71, and outputs the image data to the image data output control part 75. The image data output control part 75 performs control for outputting the image data input from the selector 74.

Next, a description is given, with reference to FIGS. 5C and 5D, of signals input from the IPU 3 to the ICM 7. FGATEB indicates a frame gate signal indicating the size in the direction in which the paper of a document is fed. The L (LOW) period of FGATEB indicates a period during which the image data of the document are being transferred. LGATEB indicates a period during which a signal of one line is valid. The L (LOW) period of LGATEB indicates a period during which line data are being transferred. RD, GD, and BD indicate signals indicating the data of the R (red) signal, G (green) signal, and B (blue) signal, respectively, of RGB data. When the line gate signal LGATEB is LOW (asserted), their respective RGB data are transferred. The image data, line data, and RGB data are transferred as shown in the timing chart of FIG. 5D.

Next, a description is given, with reference to FIG. 6A, of a method of reading a document of a standard size such as A4, A3, A1, or A0. Referring to FIG. 6A, part (a) shows a document and part (b) shows scanner data in the case of reading the document of part (a). The frame gate signal FGATEB for the scanner data is shaped as shown in part (b). The sub scanning direction Y is the paper feed direction. The main scanning direction X is perpendicular to the sub scanning direction Y, and the size of the main scanning direction indicates the number of pixels per line. In the case of reading this standard-size document, the document size may be specified on the operations panel 16 by a user, or the document size may be known by detecting the number of lines in the sub scanning direction Y at the time of reading.

Next, a description is given, with reference to FIG. 6B, of a method of reading a document when the document is not of a standard-size and is elongated in the sub scanning direction Y as shown in part (a) of FIG. 6B. In FIG. 6B, part (b) shows scanner data in the case of reading the document of part (a). In the case of such an elongated document, whose size is non-standard, it is common to determine the document size by detecting the number of lines of the document at the time of reading. The number of lines input at this point, which indicates the document length, is counted in the image data input control part 71 shown in FIG. 5B to be reported to the system controller 12 as information on the document.

Next, a description is given, with reference to FIGS. 6C and 6D, of operations of the image data input control part 71 that performs such input control.

Referring to FIG. 6C, the image data input control part 71 includes the input control sequencer 711, a line counter (LCNT) 712, and a document line number register (NLINE) 713. The input control sequencer 711 includes a state machine, and performs counting and controls data input/output. The LCNT 712 has its counter once reset by asserting a reset signal res_LCNT before reading a document. Every time one line of scanner data is captured, a counter increment signal inc_LCNT is asserted, so that the number of lines of received scanner data is counted. The NLINE 713 stores the number of lines of the document. When the reading of the document ends and the frame gate signal FGATEB is negated, the load signal ld_NLINE of the NLINE 713 is asserted so that the value of the LCNT 712 is stored in the NLINE 713. Thereafter, the process controller 22 performing engine-side control reads the value of the NLINE 713, so that the number of lines of the document, that is, the length of the document, is known (determined).

FIG. 6D shows a state transition diagram of the state machine forming the input control sequencer 711.

State S0 is an idle state, where the reset signal res_LCNT of the LCNT 712 is asserted to reset the LCNT 712. In this state, reading of a document is started, and when the frame gate signal FGATEB is asserted, a transition is made to state S1, which is a scanner data transmission state. In state S1, every time one line of the scanner data of the document is input (received), that is, every time the line gate signal LGATEB is asserted, the increment signal inc_LCNT of the LCNT 712 is asserted, and the number of lines of input (received) scanner data is counted.

When it is known from the negation of the frame gate signal FGATEB (FGATEB=H [HIGH]) that the reading of the document has come to an end, a transition is made from state S1 to state S2, which is a line counter value storing state. In state S2, the load signal ld_NLINE is output in order to load the value of the LCNT 712 at the time of the negation of the frame gate signal FGATEB into the NLINE 713, which stores the number of lines at the time of negation of the frame gate signal FGATEB. Then, a transition is made to state S3, which is a scanner data transmission end state. In state S3, the reading of the document ends, and the reading end signal READ_END indicating the end of transmission of scanner data is asserted.

Next, a description is given, with reference to FIGS. 7A and 7B, of a processing procedure in the case of reading and coding a standard-size document.

FIG. 7A shows a flow of image data in the case of reading and coding a standard-size document in the system configuration shown in FIG. 5A. FIG. 7B shows a flowchart showing a processing flow in this case.

First, a description is given of an image flow indicated by image (data) path P11 in FIG. 7A. In step S11 of FIG. 7B, when reading of a document is started, the paper sheet(s) of the document to be read is fed in the reading unit 1. Then, the read image of the document is converted from an analog signal into a digital signal in the SBU 2. The image data of the document are subjected to scanner correction in the IPU 3, and are thereafter transferred to the ICM 7. The image data are once stored in the BMEM 8, and are thereafter coded in the ICM 7. At this point, because it is determined in advance that the read image is a standard size, and the number of lines of the document is known, a code is generated so as to include this number of lines in its header. Thereafter, the code data are transferred through the CDIC 4, the parallel bus 10, and the IMAC 11 to be stored in the MEM 14.

Thereafter, if it is determined in step S11a that the reading of the document is completed (YES in step S11a), in step S12, the code data are read out from the MEM 14 to be stored in the HDD 13 through the IMAC 11 as indicated by image path P12 in FIG. 7A.

Next, a description is given, with reference to FIGS. 8A and 8B, of a processing procedure in the case of reading and coding a document of an unknown image size.

FIG. 8A is a diagram showing an image flow in the case of reading and coding a document of an unknown image size.

FIG. 8B is a flowchart showing a processing flow in this case.

Referring to FIG. 8A, the image flow indicated by image (data) path P21 is the same as that indicated by image (data) path P11 except that the document size is unknown in FIG. 8A. Therefore, in the case of performing coding in the ICM 7, the code indicating the number of lines Y shown in FIG. 2C is generated with a dummy, provisional number of lines (0 to 65,535), and is transmitted to the MEM 14 on the controller side. Thereafter, it is determined in step S21a whether the reading of the document is completed.

When the reading of the document is completed (YES in step S21a), since the number of lines NLINE of the document read is determined by the line number counting function (FIG. 6C) of the image data input control part 71 in the ICM 7, in step S22, the process controller 22 reads the determined number of lines as indicated by image path P22 in FIG. 8A.

Then, in step S23, this number of lines of the document is transmitted from the process controller 22 to the system controller 12 as indicated by image path P23 in FIG. 8A.

Next, in step S24, the system controller 12 generates a frame header containing the number of lines based on the number of lines of the document transmitted from the process controller 22, and updates the coded data of the document stored in the MEM 14 by overwriting (replacing), with the frame header generated by the system controller 12, the frame header generated in advance with the dummy, provisional number of lines and stored in the MEM 14 as indicated by image path P24 in FIG. 8A. Then, finally, in step S25, the coded data of the document stored in the MEM 14 are read to be stored in the HDD 13 as indicated by image path P25 in FIG. 8A.

Performing coding on an unknown-size document on the engine side as described above is advantageous, for example, in the following ways:

(a) the wide MFP is enabled to perform coding on the A0-size or elongated document;

(b) the capacity of a memory on the controller side can be significantly reduced; and (c) reading productivity can be significantly improved.

The memory capacity required on the controller side at the time of coding depends on the compression rate at the time of coding (compression). The compression rate varies depending on the pattern of a document or an image quality setting. Compression rates for frequently-used documents range approximately from 2, which is the lowest, to 40, which is the highest. The representative value of the compression rate necessary for designing, determined by averaging these compression rates for the respective documents, is approximately 10. Here, using this value of 10, the controller-side memory capacity required at the time of coding for each of the A3-size, A1-size, A0-size, and elongated document is determined. The BMEM 8 of the system configuration shown in FIG. 5A, which is only used to output image data in a format necessary for coding to the ICM 7, may have a small capacity. Here, it is assumed that the BMEM 8 has a capacity of 32 MB, and the required memory capacity is calculated with this capacity of the BMEM 8 being added to the capacity of the memory 14 on the controller side. The required memory capacity for each case (size) is as shown in TABLE 5 below.

TABLE 5

| DOCUMENT | SIZE (MAIN SCANNING DIRECTION × SUB SCANNING DIRECTION) | REQUIRED MEMORY CAPACITY (CONVENTIONAL) | REQUIRED MEMORY CAPACITY (THIS EMBODIMENT) |
|---|---|---|---|
| A3 | 297 mm × 420 mm | 199 MB | 32 + 199/10 = 51.9 MB |
| A1 | 594 mm × 841 mm | 798 MB | 32 + 798/10 = 111.8 MB |
| A0 | 841 mm × 1189 mm | 1596 MB | 32 + 1596/10 = 191.6 MB |
| ELONGATED | 841 mm × 2774 mm | 3725 MB | 32 + 3725/10 = 404.5 MB |

Thus, according to this embodiment, it is possible to dramatically reduce the required memory capacity compared with the conventional technique, which greatly contributes to cost reduction. Further, according to the conventional technique, the total memory capacity on the controller side is approximately 2 GB at a maximum. Of this memory capacity, it is approximately half or 1 GB that can be used for scanner reading. With this capacity, it is possible to read up to the A1-size document with 600 dpi, but it is not possible to read the A0-size or elongated document with 600 dpi. However, by performing coding on the engine side, even the longest document can do with only 404.5 MB, so that it is possible to read an elongated document in the wide MFP.

Next, a description is given of improvement in reading productivity. According to this embodiment, it is possible to start coding at the same time with document reading. Accordingly, coding ends when document reading ends. Coded data are stored in the controller-side memory. Thereafter, the number of lines is reported from the engine side to the controller side. Updating is performed by coding only the part of this number of lines. The time required for this updating is less than a second. Here, it is assumed that this updating by coding the part of the number of lines takes one second. By adding this one second to the reading time, the scanner productivity for each of the cases of the A3-size document, the A0-size document, and the elongated document is obtained as follows (TABLE 6). Here, the applied scanner reading rate of 100 mm/s is the same as in the conventional case (TABLE 2).

TABLE 6

| DOCUMENT | SIZE (MAIN SCANNING DIRECTION × SUB SCANNING DIRECTION) | READING TIME + ONE SECOND | SCANNER PRODUCTIVITY |
|---|---|---|---|
| A3 | 297 mm × 420 mm | 5.2 s | 11.5 SPM |
| A0 | 841 mm × 1189 mm | 12.9 s | 4.7 SPM |
| ELONGATED | 841 mm × 2774 mm | 28.7 s | 2.1 SPM |

Considering that the scanner productivity is 7.0 SPM in the case of A3 size, 1.3 SPM in the case of A0 size, and 0.5 SPM in the case of elongated size in the conventional case (TABLE 4), the performance is two to four times better according to this embodiment. This considerably reduces the waiting time of a user before the end of reading after the user sets a document to be read, so that user operability is significantly improved.

Next, a description is given, with reference to FIGS. 9A and 9B, another processing method according to this embodiment. FIG. 9A is a diagram showing the case of performing updating by generating a code containing the number of lines after the end of reading in the ICM 7 on the engine side and overwriting (replacing) an already transmitted code part containing a provisional number of lines with the generated code. FIG. 9B is a flowchart showing a processing flow in this case.

Step S31 of FIG. 9B, in which the ICM 7 performs coding while reading a document and stores coded data in the MEN 14 on the controller side as indicated by image path P31 in FIG. 9A, is the same as step S21 in FIG. 8B (image path P21 in FIG. 8A).

Thereafter, if it is determined in step S31a that the reading of the document is completed (YES in step S31a), in step S32, the ICM detects the number of input lines, and generates a code containing the number of lines using this detected value and transmits the generated code to the MEM 14 on the controller side as indicated by image path P32 in FIG. 9A. Thereby, the transmitted code already generated with a provisional number of lines is updated (replaced).

Thereafter, in step S33, the coded data are read out from the MEN 14 to be stored in the HOD 13 as indicated by image path P33 in FIG. 9A.

Consideration is given to the scanner productivity in this case. In the case illustrated in FIG. 8A, the number of lines is transmitted from the engine side to the system controller 12, and the code is re-generated and updated by the system controller 12. On the other hand, in the case of FIG. 9A, a code containing the number of lines is generated in a hardware manner, and updating is performed by overwriting at the time of transmitting the generated code. Therefore, updating of the number of lines takes little time. Accordingly, the time required for coding a document image can be considered as reading time. Thus, the scanner productivity for each of the A3-size document, the A0-size document, and the elongated document is as follows (TABLE 7).

TABLE 7

| DOCUMENT | SIZE (MAIN SCANNING DIRECTION × SUB SCANNING DIRECTION) | READING TIME | SCANNER PRODUCTIVITY |
|---|---|---|---|
| A3 | 297 mm × 420 mm | 4.2 s | 14.3 SPM |
| A0 | 841 mm × 1189 mm | 11.9 s | 5.0 SPM |
| ELONGATED | 841 mm × 2774 mm | 27.7 s | 2.2 SPM |

TABLE 7 shows that it is possible to further improve the productivity in the case of FIG. 9A compared with the case shown in FIG. 8A. Further, since it is possible to update a code containing the number of lines in a hardware manner in the case of FIG. 9A, there is the advantage that it is possible to simplify control compared with the case of FIG. 8A.

As described above, according to the embodiment of the present invention, the document reader (reader apparatus) is configured to code image data with a provisional number of lines while reading a unknown-size document and store the coded image data in an image memory, and to replace a header of the provisional number of lines with a header of a determined number of lines at the end of document reading. Accordingly, it is possible to read and code an image at the same time, so that it is possible to reduce necessary memory capacity and to improve reading productivity.

Thus, according to one aspect of the present invention, it is possible to simultaneously read and code the image of an original material whose size in the original material feed direction is unknown, so that it is possible to reduce necessary memory capacity and to improve reading productivity.

A reader apparatus according to the present invention is best for digital copiers, scanners, and MFPs, which store image data read from an original material such as a document.

The present invention is not limited to the specifically disclosed embodiment, and variations and modifications may be made without departing from the scope of the present invention.

The present application is based on Japanese Priority Patent Application No. 2007-145133, filed on May 31, 2007, the entire contents of which are hereby incorporated by reference.

What is claimed is:

1. A reader apparatus, comprising:
    a reading part configured to read an image of an original material;
    a coding part configured to code data of the read image of the original material;
    an image memory configured to contain the coded data of the image of the original material; and
    a controller configured to control the reading of the image of the original material and the coding of the data of the image of the original material,
    wherein the coding part includes
    a counting part configured to count a number of lines of the image of the original material, the number of lines indicating a size of the image of the original material in an original material feed direction in which the original material is fed;
    a provisional coding part configured to code the data of the image of the original material with a provisional number of lines in response to the size of the image of the original material in the original material feed direction being unknown; and
    a determination part configured to determine the number of lines of the image of the original material at an end of the reading of the image of the original material, and
    the controller includes a replacement part configured to replace the provisional number of lines in the coded data with the determined number of lines.

2. The reader apparatus as claimed in claim 1, wherein the coding part further comprises a notification part configured to notify the controller of the number of lines upon the determination part determining the number of lines of the image of the original material, and
    the controller further comprises a generation part configured to generate a header part containing the determined number of lines.

3. The reader apparatus as claimed in claim 1, wherein the coding part further comprises:
    a generation part configured to generate a header part containing the determined number of lines upon the determination part determining the number of lines of the image of the original material; and
    a transmission part configured to transmit the generated header part to the controller.

4. The reader apparatus as claimed in claim 3, wherein the coding part further comprises a part configured to specify an address of a header part containing the provisional number of lines in the coded data contained in the image memory and transmit the generated header part to the controller.

5. The reader apparatus as claimed in claim 1, wherein the coding part further comprises:
    a measurement part configured to measure an amount of the coded data; and
    a notification part configured to notify the controller of the measure amount of the coded data.

6. The reader apparatus as claimed in claim 1, wherein the coding part further comprises:
    a measurement part configured to measure an amount of the coded data; and
    a notification part configured to notify the controller that the amount of the coded data has exceeded a preset value upon the measured amount of the coded data exceeding the preset value.

7. The reader apparatus as claimed in claim 1, wherein the coding part further comprises a notification part configured to notify the controller that the number of lines of the image of the original material has exceeded a preset value upon the counted number of lines exceeding the preset value.

8. The reader apparatus as claimed in claim 1, wherein the coding part further comprises:
    a detection part configured to detect an occurrence of a buffer overflow due to a relative delay in coding the data of the image of the original material; and
    a notification part configured to notify the controller of the occurrence of the buffer overflow.

9. The reader apparatus as claimed in claim 8, wherein the controller further comprises a part configured to notify an operations panel to display a necessity of one of a decrease in a resolution for reading the original material and an increase in a compression rate for the data of the image in response to reception of the notification of the occurrence of the buffer overflow.

10. A reading method, comprising:
    reading an image of an original material, whose number of lines indicating a size of the image in a direction in which the original material is fed is unknown, while counting the number of lines;
    coding data of the read image of the original material with a provisional number of lines, and storing the coded data in an image memory; and
    upon determination of the number of lines of the image of the original material at an end of the reading of the image of the original material, generating a header part containing the determined number of lines, and replacing a header part of the coded data stored in the image memory with the header part containing the determined number of lines.

11. The reading method as claimed in claim 10, further comprising:
    displaying a necessity of one of a decrease in a resolution for reading the original material and an increase in a compression rate for the data of the image on an operations panel in response to detection of an occurrence of a buffer overflow due to a relative delay in coding the data of the image of the original material.

* * * * *